US012795511B2

(12) United States Patent
Bergström et al.

(10) Patent No.: US 12,795,511 B2
(45) Date of Patent: Nov. 10, 2026

(54) TECHNIQUE FOR HANDLING SYSTEM INFORMATION IN A RELAYED WIRELESS COMMUNICATION

(71) Applicant: Telefonaktiebolaget LM Ericsson (PUBL), Stockholm (SE)

(72) Inventors: Mattias Bergström, Sollentuna (SE); Antonino Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 376 days.

(21) Appl. No.: 18/570,174

(22) PCT Filed: Jun. 8, 2022

(86) PCT No.: PCT/EP2022/065544
§ 371 (c)(1),
(2) Date: Dec. 14, 2023

(87) PCT Pub. No.: WO2022/263252
PCT Pub. Date: Dec. 22, 2022

(65) Prior Publication Data

US 2024/0276352 A1 Aug. 15, 2024

Related U.S. Application Data

(60) Provisional application No. 63/210,302, filed on Jun. 14, 2021.

(51) Int. Cl.
*H04W 48/08* (2009.01)
*H04W 4/90* (2018.01)
*H04W 88/04* (2009.01)

(52) U.S. Cl.
CPC ............ *H04W 48/08* (2013.01); *H04W 4/90* (2018.02); *H04W 88/04* (2013.01)

(58) Field of Classification Search
CPC ....... H04W 4/02; H04W 4/029; H04W 48/14; H04W 12/08; H04W 12/63; G06F 21/554;
(Continued)

(56) References Cited

U.S. PATENT DOCUMENTS

2021/0120476 A1* 4/2021 Lee ...................... H04W 48/10
2022/0030411 A1* 1/2022 Venkatram ............. H04W 4/90

FOREIGN PATENT DOCUMENTS

WO WO2018194390 10/2018

OTHER PUBLICATIONS

3GPP TR 23.752 v17.0.0 (Mar. 2021); 3rd Generation Partnership Project; Technical Specification Group Services and System Aspects; Study on system enhancement for Proximity based Services (ProSe) in the 5G System (5GS) (Release 17).

(Continued)

*Primary Examiner* — Dady Chery
(74) *Attorney, Agent, or Firm* — Sonoda & Kobayashi Intellectual Property Law; Sarvajit S. Patil

(57) ABSTRACT

A remote wireless device (100) in relayed wireless communication (902) with a second cell (250) of an access network (900) performs a method aspect. The relayed wireless communication (902) is relayed through a relay wireless device (200) located in the second cell (250) while the remote wireless device (100) is located in a first cell (150) of the access network (900) other than the second cell (250). The remote wireless device (100) receives (502) system information, SI1, of the first cell (150); and receives (504) system information, SI2, of the second cell (250).

18 Claims, 13 Drawing Sheets

900

(58) Field of Classification Search
CPC ......... G06F 21/6218; G06F 2221/2101; G08B 5/36; H04L 67/52; H04L 67/75; H04M 1/72403; H04M 1/72457; H04M 3/42; H04M 1/663; H04M 2250/10
See application file for complete search history.

(56) References Cited

OTHER PUBLICATIONS

3GPP TS 38.331 v16.4.1 (Mar. 2021) 3rd Generation Partnership Project; Technical Specification group radio Access Network; NR; Radio Resource Control (RRC) protocol specification (Release 16).
3GPP TSG RAN WG2 #98, Hangzhou, China, May 15-19, 2017; Title: Discussion on the system information delivery; Source: ZTE; Agenda item: 9.1.2.2 (R2-1704637).
3GPP TSG-RAN WG2 Meeting #114 Electronic, Elbonia, May 19-27, 2021; Agenda Item: 8.7.4.1; Source: Nokia, Nokia Shanghai Bell; Title: SIB Handling in Sidelink UE-to-NW Relay (R2-2105739).
3GPP TSG-RAN WG2 #115-e; Electronic meeting, Aug. 9-Aug. 27, 2021; Agenda Item: 8.7.2.1; Source: Ericsson; Title: Discussion on paging and SIB handling for L2 sidelink relay (R2-2108192).
PCT International Search Report issued for International application No. PCT/EP2022/065544—Oct. 7, 2022.
PCT Written Opinion of the International Searching Authority issued for International application No. PCT/EP2022/065544—Oct. 7, 2022.

* cited by examiner

500

600

700

800

900

900

900

10A00

1200

1300

1400

1500

TECHNIQUE FOR HANDLING SYSTEM INFORMATION IN A RELAYED WIRELESS COMMUNICATION

PRIORITY

This nonprovisional application is a U.S. National Stage Filing under 35 U.S.C. § 371 of International Patent Application Serial No. PCT/EP2022/065544 filed Jun. 8, 2022 and entitled "TECHNIQUE FOR HANDLING SYSTEM INFORMATION IN A RELAYED WIRELESS COMMUNICATION," which claims priority to U.S. Provisional Patent Application No. 63/210,302 filed Jun. 14, 2021, both of which are hereby incorporated by reference in their entirety.

TECHNICAL FIELD

The present disclosure relates to a technique for handling system information in a relayed wireless communication. More specifically, and without limitation, methods and devices are provided for handling public warning system (PWS) information in a relayed wireless communication.

BACKGROUND

The Third Generation Partnership Project (3GPP) defined sidelinks (SLs) in Release 12 as an adaptation of the Long Term Evolution (LTE) radio access technology for direct communication between two wireless devices, also referred to as user equipment (UE), without going through a network node. Such device-to-device (D2D) communications through SLs are also referred to as proximity service (ProSe) and can be used for Public Safety communications. While conventional public safety communications use different standards in different geographical regions and countries, 3GPP SL communications enable interworking of different public safety groups. 3GPP has enriched SLs in Release 13 for public safety and commercial communication use-cases and, in Release 14, for vehicle-to-everything (V2X) scenarios.

3GPP and the Wi-Fi Alliance specify radio access technologies (RATs) such as Fourth Generation Long Term Evolution (4G LTE), Fifth Generation New Radio (5G NR) and Wi-Fi, each of which supports device-to-device (D2D) communications. Herein, the expression sidelink (SL) is used for any D2D communication independent of the RAT.

The SL may be used to relay a data to or from a remote wireless device (e.g., a remote UE or RM-UE), e.g., in case a relay wireless device (e.g., a relay UE or RL-UE) has coverage by a cell of a 3GPP network node such as a gNB, while the remote radio device is out of coverage or is in a bad channel condition relative to a network node.

The document WO 2018/194 390 teaches that the relay UE should forward system information (SI) received from its serving cell if a cell identifier indicated by the remote UE to the relay UE is different from its serving cell.

However, the relevance of some pieces of SI, such as public warning system (PWS) information, depend on the location of the UE. Hence, in the existing technique, the remote UE may be provided with irrelevant information or may miss relevant information.

SUMMARY

Accordingly, there is a need for a technique that allows handling at least some portions of system information, e.g., PWS information, in a relayed wireless communication depending on location.

As to a first method aspect, a method performed by a remote wireless device is provided. The remote wireless device is in relayed wireless communication with a second cell of an access network. The relayed wireless communication is relayed through a relay wireless device located in the second cell while the remote wireless device is located in a first cell of the access network other than the second cell. The method comprises or initiates a step of receiving system information (SI1) of the first cell. The method further comprises or initiates a step of receiving system information (SI2) of the second cell.

The first method aspect may be performed by a remote wireless device.

The remote wireless device may use SI1 or a portion (e.g., one or more parameters) of the SI1 in addition to, or as a substitute of, the SI2 or a (e.g., corresponding) portion (e.g., the one or more parameters) of the SI2. For example, the SI1 may comprise local information that is relevant (e.g., pertinent) to the remote wireless device because of its location in the first cell. Alternatively or in addition, the SI1 may comprise information that is relevant to the remote wireless device in the first cell and not relevant for the relay wireless device in the second cell. Alternatively or in addition, the SI1 may comprise information that is relevant for wireless devices in the first cell and that is absent in the SI2.

Referring to the first cell may comprise referring to a first network node of the access network providing wireless access in the first cell. Alternatively or in addition, referring to the first cell may comprise referring to an area that is covered by or associated with the first cell and/or the first network node. Alternatively or in addition, referring to the second cell may comprise referring to a second network node of the access network providing wireless access in the second cell. Alternatively or in addition, referring to the second cell may comprise referring to an area that is covered by or associated with the second cell and/or the second network node.

Each of the SI1 and/or the SI2 may comprise a Master Information Block (MIB) and one or more System Information Blocks (SIBs) of the first and second cell, respectively.

The first cell (e.g., an area covered by the first cell) and the second cell (e.g., an area covered by the first cell) may be disjoint. Alternatively or in addition, the remote wireless device may be outside of the second cell. Alternatively or in addition, the relay wireless device may be outside of the first cell.

A wireless communication (e.g., a direct or relayed wireless communication) may be a radio communication or an optical communication, e.g., a free-space optical communication (FSO). The FSO may uses (e.g., visible or non-visible) light propagating in free space. Herein, free space may refer to air, see water, outer space, or vacuum. This may contrast with using solids such as optical fiber cable.

The first cell may be a cell of the access network resulting from a cell selection and/or a cell reselection performed by the remote wireless device. The remote wireless device may be located in the first cell in that the first cell is the cell resulting from a cell selection and/or a cell reselection performed by the remote wireless device. Alternatively or in addition, the first cell may be referred to as the serving cell of the remote wireless device in that the first cell is the cell resulting from a cell selection and/or a cell reselection performed by the remote wireless device.

Optionally, the first cell does not transmit data (e.g., payload or user data) to the remote wireless device and/or the first cell does not receive data from the remote wireless device. The second cell may transmit data in the relayed wireless communication to the remote wireless device and/or may receive data in the relayed wireless communication from the remote wireless device. Alternatively or in addition, remote wireless device may camp on the first cell and/or the remote wireless device is not in a radio resource control (RRC) connected or RRC idle state with the first cell.

The relayed wireless communication may comprise a sidelink between the remote wireless device and the relay wireless device. The sidelink may comprise a chain of sidelinks, i.e., one or multiple hops. In other words, the chain of sidelinks may comprise sidelinks between one or more intermediate wireless devices. The chain of sidelink may also be referred to as sidelink relay path. Alternatively or in addition, the relayed wireless communication may comprise a (e.g., direct or further relayed) wireless link between the relay wireless device and the second cell (e.g., the second network node serving the relay wireless device).

The SI2 may be indicative of an access stratum (AS) of the second cell. Alternatively or in addition, the SI2 may be indicative of a non-access stratum (NAS) of a core network of the second cell. Alternatively or in addition, the SI2 may comprise a master information block (MIB) of the second cell. Alternatively or in addition, the SI2 may comprise at least one of a system information block 1 (SIB1) of the second cell, a system information block 2 (SIB2) of the second cell, a system information block 3 (SIB3) of the second cell, a system information block 4 (SIB4) of the second cell, a system information block 5 (SIB5) of the second cell, a system information block 11 (SIB11) of the second cell, a system information block 12 (SIB12) of the second cell, a system information block 13 (SIB13) of the second cell, and a system information block 14 (SIB14) of the second cell.

Alternatively or in addition, the SI2 may be received and/or updated according to TS 38.331, version 15.3.0 or 16.4.1, e.g., clause 5.2.2.2.2.

The SI1 may be incomplete or partial system information of the first cell. For example, the SI1 may be only a portion of the system information broadcasted by the first cell. Alternatively or in addition, the remote wireless device may apply the SI1 incompletely or partially. For example, the remote wireless device may apply only a portion of the SI1.

The SI1 may comprise public warning system (PWS) information relevant to the first cell. Alternatively or in addition, the remote wireless device may acquire, based on the SI1, only the PWS information relevant to the first cell.

The SI1 may comprise at least one of a system information block 6 (SIB6) of the first cell, a system information block 7 (SIB7) of the first cell, and a system information block (SIB8) of the first cell. Alternatively or in addition, the remote wireless device may acquire, based on the SI1, only at least one of the SIB6 of the first cell, the SIB7 of the first cell, and the SIB8 of the first cell.

At least one of the SIB6 of the first cell, the SIB7 of the first cell, and SIB8 of the second cell may be indicative of the PWS information.

System information applied by the remote wireless device may be a combination of the SI1 and the SI2.

In the case of conflicting information in the SI1 and the SI2, the remote wireless device, the combination may include the information that is relevant, or more relevant, to the remote wireless device. The combination may be consistent and/or free of conflicting information.

Herein, acting on PWS information may comprise outputting the PWS information at the remote wireless device. Alternatively or in addition, discarding PWS information may comprise not outputting the PWS information at the remote wireless device.

The remote wireless device may act on both PWS information in the SI1 and PWS information in the SI2. Acting on both PWS information in the SI1 and PWS information in the SI2 may comprise outputting the respective PWS information at the remote wireless device responsive to the reception of the SI1 and the SI2, respectively. The output may differentiate between PWS information in the SI1 and PWS information in the SI2.

The remote wireless device may apply a portion of the SI1 and a portion of the SI2.

The remote wireless device may selectively apply a portion of the SI1 and a portion of the SI2 depending on which portion is relevant, or more relevant, to the remote wireless device. The portions may be complementary and/or may relate to different parameters (e.g., disjoint sets of parameters) for operating the remote wireless device.

The SI1 may comprise only at least one of the PWS information of the first cell, the SIB6 of the first cell, the SIB7 of the first cell, and the SIB8 of the first cell. Alternatively or in addition, the remote wireless device may apply, exclusively based on the SI1, at least one of the PWS information of the first cell, the SIB6 of the first cell, the SIB7 of the first cell, and the SIB8 of the first cell.

Optionally, the SI1 does not comprises at least one or each of a MIB of the first cell, a SIB1 through a SIB5 of the first cell, and a SIB11 through SIB14 of the first cell.

The remote wireless device may acquire at least one of the MIB of the first cell and the SIB1 of the first cell. The SI1 may be received using at least one of the MIB of the first cell and the SIB1 of the first cell. For example, the remote wireless device may receive the SI1 according to scheduling information in the SIB1 of the first cell.

The remote wireless device may maintain in its memory first system information for the first cell based on at least one of the MIB of the first cell and the SIB1 of the first cell and second system information for the second cell based on at least one of the MIB of the second cell and the SIB1 of the second cell.

The SI1 may be received using the first system information. The SI2 may be received using the second system information. The first system information and second first system information may be maintained separately in the memory of the remote wireless device, e.g., in different wireless device variables.

The remote wireless device may refrain from applying, based on the SI1, at least one or each of a SIB2 through a SIB5 of the first cell and a SIB11 through a SIB14 of the first cell. Alternatively or in addition, the remote wireless device may refrain from acquiring, in the step of receiving the SI1, at least one or each of the SIB2 through the SIB5 of the first cell, and the SIB11 through the SIB14 of the first cell.

The SI2 may comprise PWS information relevant to the second cell. The method may further comprise or initiate at least one of the steps of: discarding the PWS information relevant to the second cell; replacing the PWS information relevant to the second cell by PWS information relevant to the first cell received in the SI1; and acting only on PWS information relevant to the first cell received in the SI1.

The SI2 may comprise PWS information relevant to the second cell. The method may further comprise or initiate a step of selectively acting on and discarding the PWS information relevant to the second cell. Optionally, the remote wireless device may act on the PWS information relevant to the second cell if the SI1 does not comprise PWS information relevant to the first cell and/or if the SI1 or the PWS information relevant to the first cell in the SI1 is older than the SI2 or the PWS information relevant to the second cell in the SI2 and/or if the SI1 or the PWS information relevant to the first cell in the SI1 is outdated. Alternatively or in addition, the remote wireless device may discard the PWS information relevant to the second cell if the SI1 comprises PWS information relevant to the first cell and/or if the SI1 or the PWS information relevant to the first cell in the SI1 is not older than the SI2 or the PWS information relevant to the second cell in the SI2 and/or if the SI1 or the PWS information relevant to the first cell in the SI1 is not outdated. Alternatively or in addition, the selectivity may depend on a type of the PWS information relevant to the second cell. Optionally, the type may include at least one of a Commercial Mobile Alert System (CMAS), an Earthquake and Tsunami Warning System (ETWS), a Wireless Emergency Alert (WEA), and a Cell Broadcast Service (CBS).

The PWS information may be indicative of a time of issuance (e.g., a time stamp) or a time of expiry. The PWS information may be outed after the time of expiry or after a validity period after the time of issuance.

Alternatively or in addition, the SI1 or the PWS information relevant to the first cell in the SI1 may be outdated if a predefined validity period expired since the remote wireless device received the SI1 or if the remote wireless device has failed to receive the SI1 or the PWS information relevant to the first cell in the SI1 for a predefined period. In the latter case, the remote wireless device may assume that its location in the first cell is uncertain or outdated.

The SI2 may be received from the second cell in the relayed wireless communication.

The SI2 may comprise all system information of the second cell acquired by the relay wireless device.

The SI1 may be received directly from the first cell. Alternatively or in addition, the SI1 may be received by reading system information broadcasted by the first cell.

The SI1 may be received at the remote wireless device in a direct wireless communication with the first cell.

The SI1 may be received less frequently than receiving the SI2.

Receiving the SI1 directly from the first cell may be a burden to the remote wireless device and/or may require a coverage enhancement performed by the remote wireless device to receive the SI1 directly from the first cell. The remote wireless device may be in a bad channel condition relative to the first cell, which may require the remote wireless device to read multiple times (e.g., more than 10 times or more than 100 times) the same copies of the SI1 to decode the SI1 successfully. This may cause a severe battery consumption in the remote wireless device, which may be reduced by receiving the SI1 less frequently.

The SI1 may be received from the second cell in the relayed wireless communication.

The remote wireless device may receive the SI1 (e.g., the PWS information relevant to the first cell) through the relay wireless device and/or from the second cell. For example, the remote wireless device may receive both the SI1 (e.g., the PWS information relevant to the first cell) and the SI2 (e.g., the PWS information relevant to the second cell) through the relay wireless device and/or from the second cell.

The remote wireless device may report a cell identity (cell ID) of the first cell to the relay wireless device and/or in the relayed wireless communication to the second cell.

The remote wireless device may perform cell selection and/or cell reselection relative to the first cell. The remote wireless device may determine the first cell or the cell ID of the first cell based on the cell selection and/or the cell reselection.

The remote wireless device may report the cell ID of the first cell upon establishing the sidelink between the remote wireless device and the relay wireless device.

The SI1 may be received in the relayed wireless communication responsive to the reporting of the cell ID of the first cell.

As to a second method aspect, a method performed by a relay wireless device is provided. The relay wireless device provides a relayed wireless communication between a remote wireless device and a second cell of an access network. The relayed wireless communication is relayed through the relay wireless device located in the second cell while the remote wireless device is located in a first cell of the access network other than the second cell. The method comprises or initiates a step of transmitting system information (SI1) of the first cell to the remote wireless device. The method further comprises or initiates a step of transmitting system information (SI2) of the second cell to the remote wireless device.

The second method aspect may be performed by the relay wireless device.

The second method aspect may further comprise any feature and/or any step disclosed in the context of the first method aspect, or a feature and/or step corresponding thereto, e.g., a receiver counterpart to a transmitter feature or step.

The second cell may serve the relay wireless device. By means of the relayed wireless communication, the second cell may transmit data (e.g., user data or payload) to the remote wireless device and/or may receive data (e.g., user data or payload) from the remote wireless device.

The relay wireless device may receive a report of a cell identity (cell ID) of the first cell from the remote wireless device.

The method may further comprise or initiate a step of transmitting a cell ID of the first cell to the second cell. The method may further comprise or initiate a step of receiving the SI1 from the second cell responsive to the transmitted cell ID of the first cell.

The relay wireless device may further receive the SI2 from the second cell, e.g., the PWS information relevant to the second cell. The SI1 (e.g., the PWS information relevant to the first cell) and the SI2 (e.g., the PWS information relevant to the second cell) may be transmitted individually.

The relay wireless device may further receive the SI2 from the second cell. The method may further comprise or initiate a step of discarding PWS information in the SI2. Only the PWS information in the SI1 may be transmitted to the remote wireless device. Alternatively or in addition, the method may further comprise or initiate a step of combining PWS information in the SI1 and PWS information in the SI2 into a combined PWS information. The combined PWS information may be transmitted to the remote wireless device.

The relay wireless device may display the PWS information in the SI2 (e.g., to a user of the relay UE). Herein, "discarding" may mean that the relay wireless device does not relay the PWS information of SI2 to the remote wireless device.

The method may further comprise the features or the steps of any one of the embodiments of the first method aspect or any feature or step corresponding thereto.

As to a third method aspect, a method performed by a first cell of an access network is provided. The first cell provides wireless access in the first cell (e.g., a coverage area of the first cell) in which a remote wireless device is located, which is in relayed wireless communication with a second cell of the access network other than the first cell. The relayed wireless communication is relayed through a relay wireless device located in the second cell. The method comprises or initiates a step of receiving a request to provide system information (SI1) of the first cell to the second cell. The method further comprises or initiates a step of sending the SI1 to the second cell for transmission to the remote wireless device in the relayed wireless communication.

The third method aspect may be performed by a first cell (e.g., a first network node providing wireless access in the first cell) in which the remote wireless device is located.

The third method aspect may further comprise any feature and/or any step disclosed in the context of the first and/or second method aspect, or a feature and/or step corresponding thereto, e.g., a network counterpart to a wireless (e.g., radio) device feature or step.

The first cell (e.g., the first node providing wireless access in the first cell) may be serving or previously serving the remote wireless device. Alternatively or in addition, the remote wireless device may camp on the first cell.

The request for the SI1 may be received from the second cell (e.g., the second node providing wireless access in the second cell). Alternatively or in addition, the request may be indicative that the requested SI1 is to be provided to the remote wireless device.

The request may be a request to provide (e.g., forward) the SI1 upon a change of the SI1 or regularly (e.g., periodically). The request may be a request to provide the SI1 until further notification from the second cell.

The SI1 may be sent from the first cell to the second cell (e.g., from the first network node to the second network node) using an X2 interface or an Xn interface according to 3GPP, e.g., according to the 3GPP document 38.420, version 16.0.0.

The request may relate to PWS information relevant to the first cell in the SI1.

The request may be a request to provide (e.g., forward) the PWS information relevant to the first cell upon a change of the PWS information or regularly (e.g., periodically). The request may be a request to provide the PWS information until further notification from the second cell.

The method may further comprise the features or the steps of any one of embodiments of the first method aspect or the second method aspect or any feature or step corresponding thereto.

As to a fourth method aspect, a method performed by a second cell of an access network is provided. The second cell provides wireless access in the second cell (e.g., in a coverage area of the second cell) in which a relay wireless device is located, which provides a relayed wireless communication between the second cell and a remote wireless device located in a first cell of the access network other than the second cell. The relayed wireless communication is relayed through the relay wireless device. The method comprises or initiates a step of receiving, from the first cell, system information (SI1) of the first cell. Alternatively or in addition, the method comprises or initiates a step of transmitting the SI1 to the remote wireless device in the relayed wireless communication or to the relay wireless device for transmission to the remote wireless device.

The fourth method aspect may be performed by a second cell (e.g., a second network node providing wireless access in the second cell) in which the relay wireless device is located.

The fourth method aspect may further comprise any feature and/or any step disclosed in the context of the first and/or second and/or third method aspect, or a feature and/or step corresponding thereto, e.g., a network counterpart to a wireless (e.g., radio) device feature or step.

The method may further comprise or initiate the step of sending, to the first cell, a request to provide the SI1 to the second cell. The SI1 may be received from the first cell in response to the sending of the request.

The SI1 may comprise PWS information relevant to the first cell.

The request may be a request to provide (e.g., forward) the PWS information relevant to the first cell upon a change of the PWS information or regularly (e.g., periodically). The request may be a request to provide the PWS information until further notification from the second cell.

The method may further comprise the features or the steps of any embodiment of the first, second, and/or third method aspect or any feature or step corresponding thereto.

As to a first device aspect, a remote wireless device is provided. The remote wireless device is in relayed wireless communication with a second cell of an access network, wherein the relayed wireless communication is relayed through a relay wireless device located in the second cell while the remote wireless device is located in a first cell of the access network other than the second cell. The remote wireless device comprises memory operable to store instructions and processing circuitry operable to execute the instructions, such that the remote wireless device is operable to perform any one of the embodiments of the first method aspect.

The processing circuitry may comprise at least one processor and a memory. Said memory may comprise instructions executable by said at least one processor whereby the remote wireless device is operative to perform any one of the steps of the first method aspect.

As to a further first device aspect, a remote wireless device is provided. The remote wireless device is in relayed wireless communication with a second cell of an access network, wherein the relayed wireless communication is relayed through a relay wireless device located in the second cell while the remote wireless device is located in a first cell of the access network other than the second cell. The remote wireless device is configured to perform any one of the embodiments of the first method aspect.

As to a still further first device aspect, a remote user equipment (UE) configured to communicate with a network node of a first cell and with a relay wireless device is provided. The remote UE comprises a radio interface and processing circuitry configured to perform any one of the embodiments of the first method aspect.

As to a second device aspect, a relay wireless device is provided. The relay wireless device provides a relayed wireless communication between a remote wireless device and a second cell of an access network, wherein the relayed wireless communication is relayed through the relay wireless device located in the second cell while the remote wireless device is located in a first cell of the access network other than the second cell. The relay wireless device comprises memory operable to store instructions and processing circuitry operable to execute the instructions, such that the relay wireless device is operable to perform any one of the embodiments of the second method aspect.

The processing circuitry may comprise at least one processor and a memory. Said memory may comprise instructions executable by said at least one processor whereby the relay wireless device is operative to perform any one of the steps of the second method aspect.

As to a further second device aspect, a relay wireless device is provided. The relay wireless device provides a relayed wireless communication between a remote wireless device and a second cell of an access network, wherein the relayed wireless communication is relayed through the relay wireless device located in the second cell while the remote wireless device is located in a first cell of the access network other than the second cell. The relay wireless device is configured to perform any one of the embodiments of the second method aspect.

As to a still further second device aspect, a relay user equipment (UE) is provided. The relay UE provides a relayed wireless communication between a remote wireless device and a second cell of an access network, wherein the relayed wireless communication is relayed through the relay wireless device located in the second cell while the remote wireless device is located in a first cell of the access network other than the second cell. The relay UE comprising a radio interface and processing circuitry configured to perform any one of the embodiments of the second method aspect.

As to a third device aspect, a first network node for wireless access in a first cell of an access network is provided. A remote wireless device is located in the first cell. The remote wireless device is in relayed wireless communication with a second cell of the access network other than the first cell. The relayed wireless communication is relayed through a relay wireless device located in the second cell. The first network node comprises memory operable to store instructions and processing circuitry operable to execute the instructions, such that the first network node is operable to perform any one of the embodiments of the third method aspect.

The processing circuitry may comprise at least one processor and a memory. Said memory may comprise instructions executable by said at least one processor whereby the first network node is operative to perform any one of the steps of the third method aspect.

As to a further third device aspect, a first network node for wireless access in a first cell of an access network is provided. A remote wireless device is located in the first cell. The remote wireless device is in relayed wireless communication with a second cell of the access network other than the first cell, wherein the relayed wireless communication is relayed through a relay wireless device located in the second cell. The first network node is configured to perform any one of the embodiments of the third method aspect.

As to a fourth device aspect, a second network node for wireless access in a second cell of an access network is provided. A relay wireless device is located in the second cell. The relay wireless device provides a relayed wireless communication between the second cell and a remote wireless device located in a first cell of the access network other than the second cell, wherein the relayed wireless communication is relayed through the relay wireless device. The second network node comprises memory operable to store instructions and processing circuitry operable to execute the instructions, such that the second network node is operable to perform any one of the embodiments of the fourth method aspect.

The processing circuitry may comprise at least one processor and a memory. Said memory may comprise instructions executable by said at least one processor whereby the second network node is operative to perform any one of the steps of the fourth method aspect.

As to a further fourth device aspect, a second network node for wireless access in a second cell of an access network is provided. A relay wireless device is located in the second cell. The relay wireless device provides a relayed wireless communication between the second cell and a remote wireless device located in a first cell of the access network other than the second cell, wherein the relayed wireless communication is relayed through the relay wireless device. The second network node is configured to perform any one of the embodiments of the fourth method aspect.

At least some embodiments of any method aspect may select portions of the SI1 and/or of the SI2 (e.g., the PWS information relevant to the first cell and to the second cell, respectively), e.g., depending on a location of the remote wireless device (e.g., a remote UE).

For concreteness and without limitation, for example in a 3GPP implementation, any wireless device may be a "radio device" or a user equipment (UE). Moreover, for concreteness and without limitation, for example in a 3GPP implementation, the access network may be a radio access network (RAN).

Any one of the method aspects may be embodied by a method of establishing a UE relaying connection (i.e., a relayed wireless communication), optionally with a desired QoS.

The technique may be applied in the context of 3GPP New Radio (NR). Unlike a SL according to 3GPP LTE, a SL according to 3GPP NR can provide a wide range of QoS levels. Therefore, at least some embodiments of the technique can ensure that the relay radio appropriate for the QoS of the traffic is selected.

The technique may be implemented in accordance with a 3GPP specification, e.g., for 3GPP release 17. The technique may be implemented for 3GPP LTE or 3GPP NR according to a modification of the 3GPP document TS 23.303, version 16.0.0 or for 3GPP NR according to a modification of the 3GPP document TS 33.303, version 16.0.0.

In any radio access technology (RAT), the technique may be implemented for providing (e.g., distributing) system information. The SL may be implemented using proximity services (ProSe), e.g. according to a 3GPP specification.

Any radio device may be a user equipment (UE), e.g., according to a 3GPP specification. The relay radio device may also be referred to as a relay UE (or briefly: relay). Alternatively or in addition, the remote radio device may also be referred to as a remote UE. Alternatively or in addition, one or more intermediate radio devices may also be referred to as further UEs.

The relay radio device and the RAN may be wirelessly connected in an uplink (UL) and/or a downlink (DL) through a Uu interface. Alternatively or in addition, the SL may enable a direct radio communication between proximal radio devices, e.g., the remote radio device and the relay radio device, optionally using a PC5 interface. Services provided using the SL or the PC5 interface may be referred to as proximity services (ProSe). Any radio device (e.g., the remote radio device and/or the relay radio device and/or the further radio device) supporting a SL may be referred to as ProSe-enabled radio device.

The relay radio device may also be referred to as ProSe UE-to-Network Relay.

The remote radio device and/or the relay radio device and/or the RAN and/or a further remote radio device may form, or may be part of, a radio network, e.g., according to the Third Generation Partnership Project (3GPP) or according to the standard family IEEE 802.11 (Wi-Fi). The first method aspect, the second method aspect and third method aspect may be performed by one or more embodiments of the remote radio device, the relay radio device and the RAN (e.g., a base station) or the further remote radio device, respectively.

The RAN may comprise one or more base stations, e.g., performing the third and/or fourth method aspect. Alternatively or in addition, the radio network may be a vehicular, ad hoc and/or mesh network comprising two or more radio devices, e.g., acting as the remote radio device and/or the relay radio device and/or the further remote radio device.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Whenever referring to the RAN, the RAN may be implemented by one or more network nodes (e.g., base stations).

The remote radio device may be wirelessly connected or connectable (e.g., according to a radio resource control, RRC, state or active mode) with the relay radio device and, optionally, the first cell (i.e., the first network node) of the RAN. The relay radio device may be wirelessly connected or connectable (e.g., according to a radio resource control, RRC, state or active mode) with the second cell of the RAN. Furthermore, the relay radio device may be wirelessly connected or connectable (e.g., according to 3GPP ProSe) with the remote radio device.

The base station may encompass any station that is configured to provide radio access to any of the radio devices. The base stations may also be referred to as cell, transmission and reception point (TRP), radio access node or access point (AP). The base station and/or the relay radio device may provide a data link to a host computer providing the user data to the remote radio device or gathering user data from the remote radio device. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer, a packet data convergence protocol (PDCP) layer, and/or a Radio Resource Control (RRC) layer of a protocol stack for the radio communication.

Herein, referring to a protocol of a layer may also refer to the corresponding layer in the protocol stack. Vice versa, referring to a layer of the protocol stack may also refer to the corresponding protocol of the layer. Any protocol may be implemented by a corresponding method.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a still further aspect a communication system including a host computer is provided. The host computer comprises a processing circuitry configured to provide user data, e.g., in the relayed wireless communication. The host computer further comprises a communication interface configured to forward the user data to a cellular network (e.g., the RAN and/or the base station) for transmission to a UE. A processing circuitry of the cellular network is configured to execute any one of the steps of the third and/or fourth method aspects. The UE comprises a radio interface and processing circuitry, which is configured to execute any one of the steps of the first and/or second method aspects.

The communication system may further include the UE. Alternatively, or in addition, the cellular network may further include one or more network nodes (e.g., base stations) configured for radio communication with the UE and/or to provide a data link between the UE and the host computer using the third and/or fourth method aspects.

The processing circuitry of the host computer may be configured to execute a host application, thereby providing the user data and/or any host computer functionality described herein. Alternatively, or in addition, the processing circuitry of the UE may be configured to execute a client application associated with the host application.

Any one of the devices, the (e.g., remote and/or relay) UEs, the network nodes (e.g., the base station), the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein:

FIG. 1 shows a schematic block diagram of an embodiment of a device in relayed wireless communication with a second cell other than a first cell which the device is located in or camps on;

FIG. 3 shows a schematic block diagram of an embodiment of a device for wireless access in a first cell, which a device according to FIG. 1 may be located in or camped on;

FIG. 4 shows a schematic block diagram of an embodiment of a device for wireless access in a second cell, which a device according to FIG. 2 may be located in or served by;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11, 3GPP LTE (e.g., LTE-Advanced or a related radio access technique such as MulteFire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
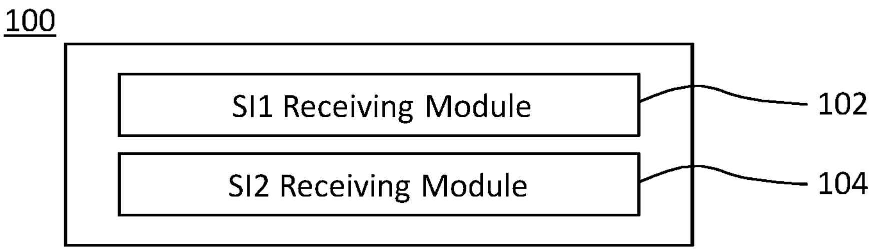

FIG. 1 schematically illustrates a block diagram of an embodiment of a device according to any one of the first device aspects. The device is generically referred to by reference sign 100.

The device 100 comprises the modules 102 and 104 indicated in FIG. 1 performing the respective steps of the first method aspect.

Any of the modules 102 and 104 of the device 100 may be implemented by units configured to provide the corresponding functionality.

The device 100 may also be referred to as, or may be embodied by, the remote (RM) wireless device (briefly: RM radio device). The RM radio device 100 and the relay (RL) wireless device (briefly RL radio device) may be in direct wireless (e.g., radio) communication, e.g., at least for receiving the SI1 and/or SI2 from the RL radio device. The RL radio device may be embodied by the device 200.

Figure 2:
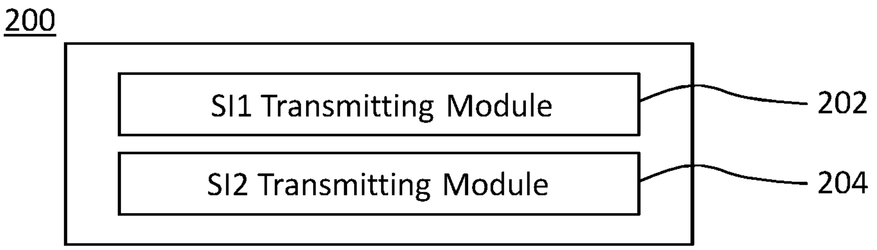
FIG. 2 shows a schematic block diagram of an embodiment of a device providing a relayed wireless communication.

FIG. 2 schematically illustrates a block diagram of an embodiment of a device according to any one of the second device aspects. The device is generically referred to by reference sign 200.

The device 200 comprises the modules 202 and 204 indicated in FIG. 2 performing the steps respective steps of the second method aspect.

Any of the modules 202 and 204 of the device 200 may be implemented by units configured to provide the corresponding functionality.

The device 200 may also be referred to as, or may be embodied by, the RL wireless device (briefly: RL radio device). The RL radio device 200 and the RM wireless device (briefly RM radio device) may be in direct wireless (e.g., radio) communication, e.g., at least for transmitting the SI1 and/or SI2 to the RM radio device. The RM radio device may be embodied by the device 100.

Figure 3:
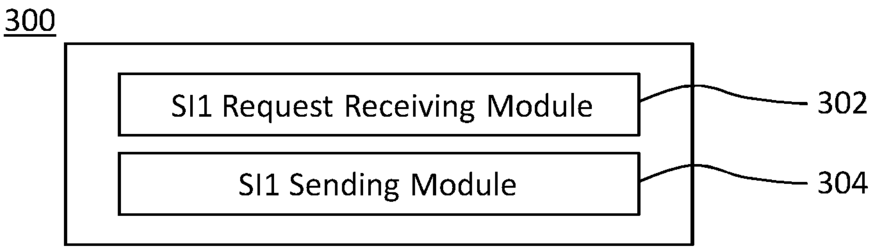

FIG. 3 schematically illustrates a block diagram of an embodiment of a device according to any one of the third device aspects. The device is generically referred to by reference sign 300.

The device 300 comprises the modules 302 and 304 indicated in FIG. 3 performing the steps respective steps of the third method aspect.

Any of the modules 302 and 304 of the device 300 may be implemented by units configured to provide the corresponding functionality.

The device 300 may also be referred to as, or may be embodied by, the first cell or the first network node.

Figure 4:
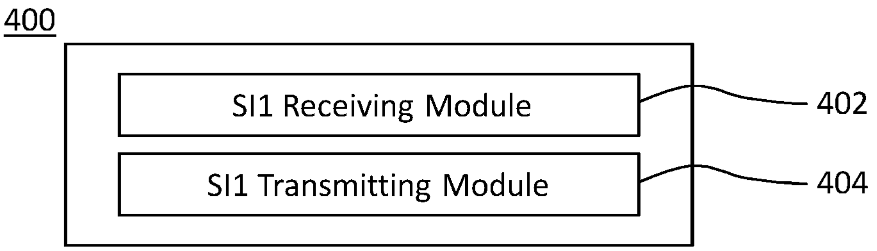

FIG. 4 schematically illustrates a block diagram of an embodiment of a device according to any one of the fourth device aspects. The device is generically referred to by reference sign 400.

The device 400 comprises the modules 402 and 404 indicated in FIG. 4 performing the steps respective steps of the fourth method aspect.

Any of the modules 402 and 404 of the device 400 may be implemented by units configured to provide the corresponding functionality.

The device 400 may also be referred to as, or may be embodied by, the second cell or the second network node.

Figure 5:
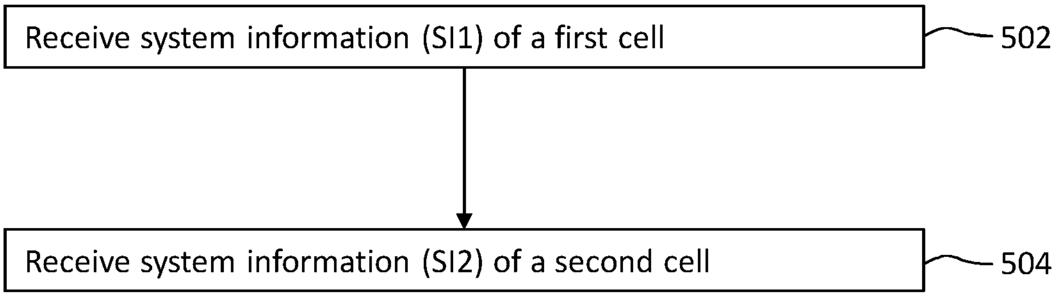
FIG. 5 shows a flowchart for a method embodiment of the first method aspect, which may be implementable by the device of FIG. 1.

FIG. 5 shows an example flowchart for a method 500 of performing the first method aspect and/or the method 500.

The method 500 may comprise the steps indicated in FIG. 5 and/or the method 500.

The method 500 may be performed by the device 100. For example, the modules 102 and 104 may perform the steps 502 and 504, respectively.

Figure 6:
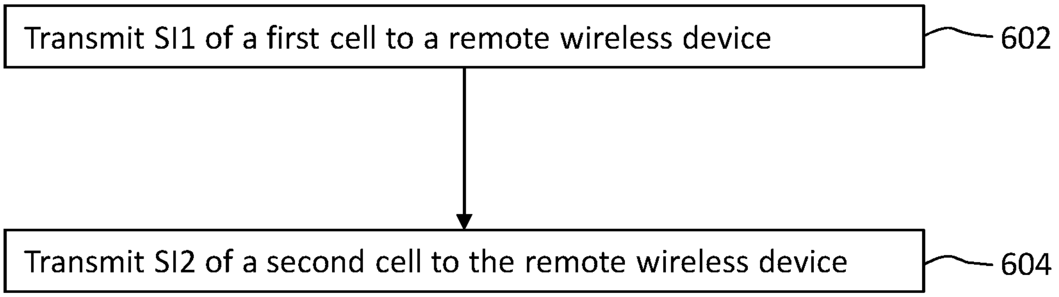
FIG. 6 shows a flowchart for a method embodiment of the second method aspect, which may be implementable by the device of FIG. 2.

FIG. 6 shows an example flowchart for a method 600 of performing the second method aspect and/or the method 600.

The method 600 may comprise the steps indicated in FIG. 6 and/or the method 600.

The method 600 may be performed by the device 200. For example, the modules 202 and 204 may perform the steps 602 and 604, respectively.

Figure 7:
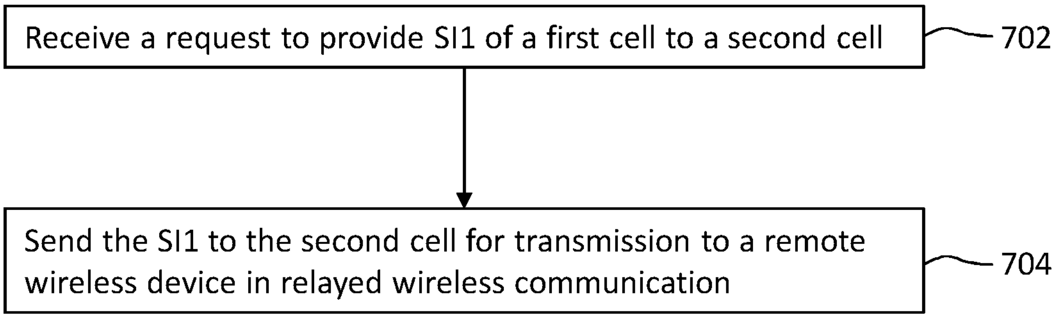
FIG. 7 shows a flowchart for a method embodiment of the third method aspect, which may be implementable by the device of FIG. 3.

FIG. 7 shows an example flowchart for a method 700 of performing the third method aspect and/or the method 700.

The method 700 may comprise the steps indicated in FIG. 7 and/or the method 700.

The method 700 may be performed by the device 300. For example, the modules 302 and 304 may perform the steps 702 and 704, respectively.

Figure 8:
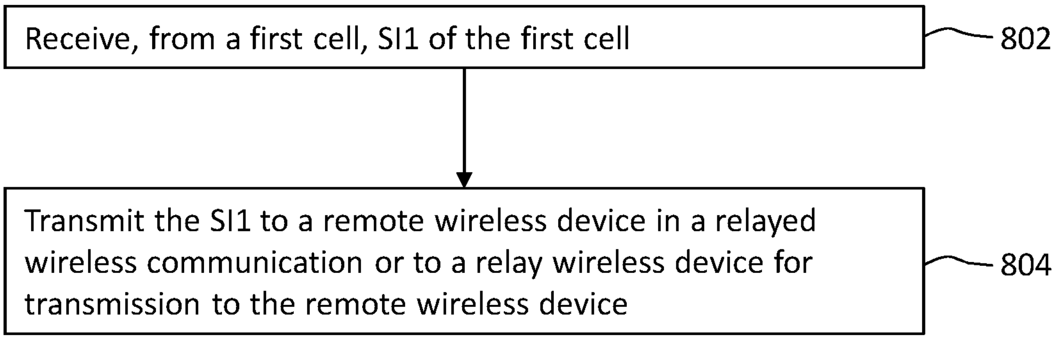
FIG. 8 shows a flowchart for a method embodiment of the fourth method aspect, which may be implementable by the device of FIG. 4.

FIG. 8 shows an example flowchart for a method 800 of performing the fourth method aspect and/or the method 800.

The method 800 may comprise the steps indicated in FIG. 8 and/or the method 800.

The method 800 may be performed by the device 400. For example, the modules 402 and 404 may perform the steps 802 and 804, respectively.

The technique may be applied to uplink (UL), downlink (DL) or direct communications between radio devices, e.g., device-to-device (D2D) communications or sidelink (SL) communications.

Each of the RM radio device 100 and RL radio device 200 may be a radio device. Each of the device 300 and the device 400 may be a cell (e.g., a corresponding a network node or a base station).

Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

According to existing techniques for sidelink relaying, the remote UE 100 receives system information from the relay UE 200, even if the first cell 150 (e.g., a serving cell 150 or a closest cell 150, or the network node 300) of the remote UE 100 is different from the second cell 250 of the relay UE 200.

A cause for this problem may be seen in the lacking distinction between system information that has a local relevance and system information that associated with the RAN independent of location.

According to embodiments of the technique, the relay UE 200 may acquire system information from the second cell 250, which the relay UE 200 is served by and/or which the relay UE 200 is located in.

In at least some situations, a remote UE 100 may be in the coverage of a different cell, i.e., the first cell 150, other than the second cell 250 of the relay UE 200.

If the remote UE 100 conventionally receives system information (e.g., SI2) from the relay UE 200, i.e., in the absence of the step of receiving the SI1, at least one of the following two failures may occur. A first failure comprises the remote UE 100 receiving PWS information, which is not relevant for the remote UE 100, e.g., because the PWS information in the SI2 may be related to a geographical area (e.g., the second cell 250) that is different from the one of the remote UE 100 (e.g., the first cell 150). A second failure comprises the remote UE 100 missing PWS information which is relevant for the remote UE 100 and/or which is usually (e.g., if the channel condition would not prevent it) provided by the serving cell 150 in which the remote UE 100 is in coverage.

At least some embodiments can ensure that the remote UE 100 receives the PWS information which is relevant for the remote UE 100 and/or which is usually provided by the serving cell 150 in which the remote UE 100 is located (e.g., in radio coverage).

A first set of embodiments may achieve this by having the remote UE 100 directly acquiring the PWS information from the relevant cell 150. A second set of embodiments, which may comprise embodiments of the first set, achieves this by having the PWS information transmitted to the remote UE 100 via the relay UE 200, e.g., in the relayed wireless communication 902.

At least one or each of the SI1 and the SI2 may comprise information (e.g., a message, notification or indication) of a Public Warning System (PWS), briefly referred to as PWS information. The SI1 may comprise PWS information relevant to the first cell 150. Alternatively or in addition, the SI2 may comprise PWS information relevant to the second cell 250.

In any embodiment, the PWS information may be implemented according to 3GPP NR (e.g., by providing a PWS indication to UEs 100 and/or 200). The PWS information may be used to provide one or more warning-messages to users of the UEs 100 and/or 200. For example, if there is an earthquake, the network 900 may indicate this to the UEs 100 and/or 200 by broadcasting the PWS information (e.g., one or more PWS-messages).

Figure 9A:
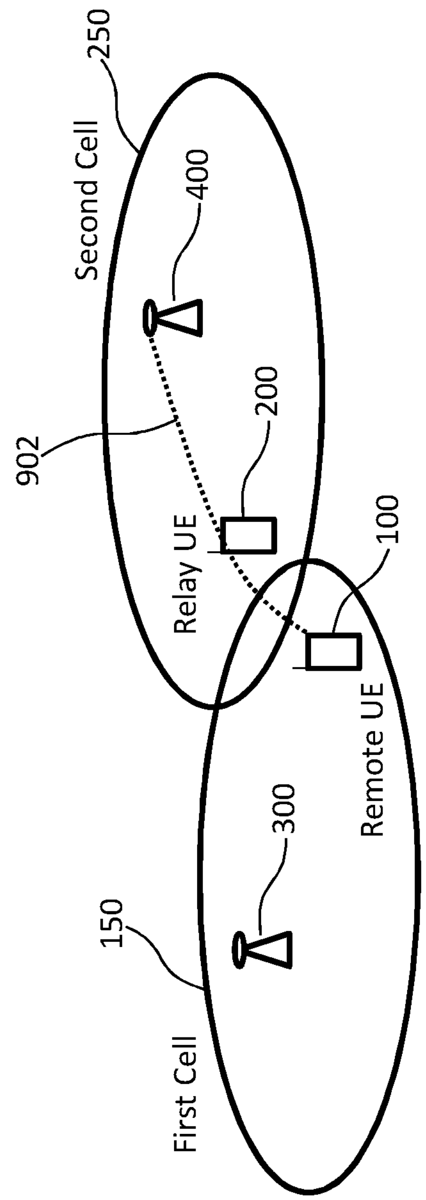
FIG. 9A schematically illustrates a first example of an access network comprising embodiments of the devices of FIGS. 1, 2, 3, and 4 for performing the methods of FIGS. 5, 6, 7, and 8, respectively.
Figure 9B:
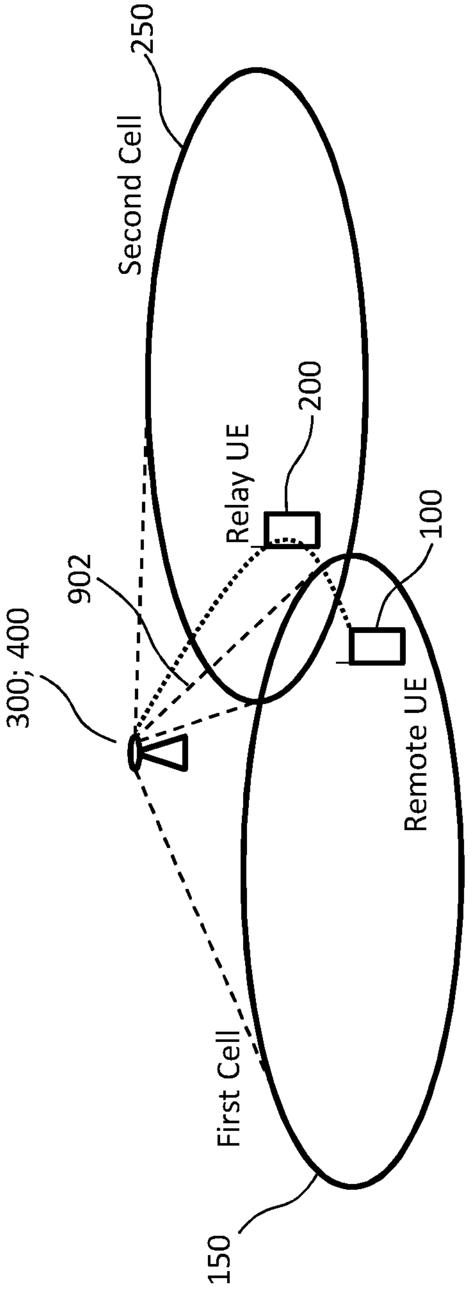
FIG. 9B schematically illustrates a second example of an access network comprising embodiments of the devices of FIGS. 1, 2, 3, and 4 for performing the methods of FIGS. 5, 6, 7, and 8, respectively.
Figure 9C:
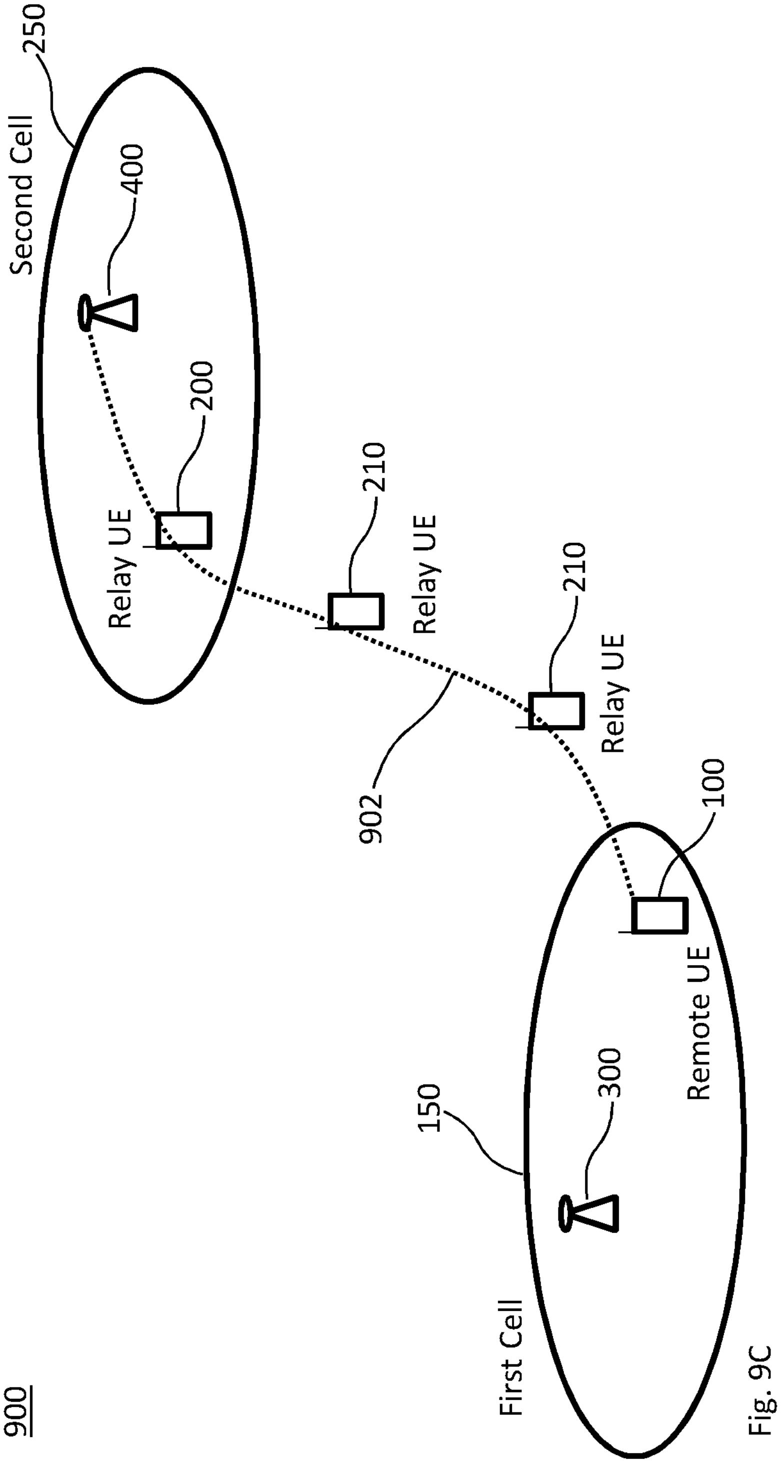
FIG. 9C schematically illustrates a third example of an access network comprising embodiments of the devices of FIGS. 1, 2, 3, and 4 for performing the methods of FIGS. 5, 6, 7, and 8, respectively.

For example, optionally as illustrated in any one of FIG. 9A, 9B or 9C, the first network node 300 and the second network node 400 may broadcast the PWS information in the first cell 150 and in the second cell 250, respectively.

The PWS information (e.g., one or more PWS-messages) of a type Earthquake and Tsunami Warning service (ETWS) may be broadcasted in SIB6 and/or SIB7. Alternatively or in addition, the PWS information (e.g., one or more PWS-messages) of the type Commercial Mobile Alert System (CMAS) may be broadcasted in SIB8. These system information blocks are defined in the NR RRC specification, e.g., in the 3GPP document TS 38.331, version 16.4.1.

In case the message is large, the message can be divided into several segments and the segments are sent sequentially to the UE. There can be at most 64 segments and the eNB 300 and/or 400 indicates for each segment which segment number this is. Furthermore, the eNB 300 and/or 400 may indicate whether a certain segment is the last segment or not. When the UE 100 and/or 200 has acquired all segments of a message, the RRC layer in the UE 100 and/or 200 reassembles all segments and forward them to upper layers to be presented to the user, which may also be referred to as acting on the PWS information.

It is possible to transmit multiple PWS messages in SIB12 or SystemInformationBlockType12 by transmitting the PWS messages sequentially. E.g., if a first message and a second message of the PWS is to be transmitted to the UE 100 and/or 200, the eNB 300 and/or 400 may firstly transmit all segments of the first message and then transmit all segments of the second message. Each PWS information (e.g., PWS message) may be transmitted periodically.

Each PWS information (e.g., each PWS message) may be indicative of and/or associated with a message identifier and/or a serial number.

The PWS information (e.g., one or more PWS messages) may be applicable only for (e.g., relevant only to) a certain area (e.g., either the first cell 150 or second cell 250). In that case, only one or more cells (e.g., the first cell 150 and/or the second cell 250) in that area may provide (e.g., broadcast in the respective cell and/or send from the first cell to the second cell) the PWS information (e.g., one or more PWS messages) while other cells may not. For example, there may be one or more requirements that some PWS information (e.g., one or more PWS messages) is not output at UEs (i.e., shall not be shown to users) outside of the area.

Figure 10A:
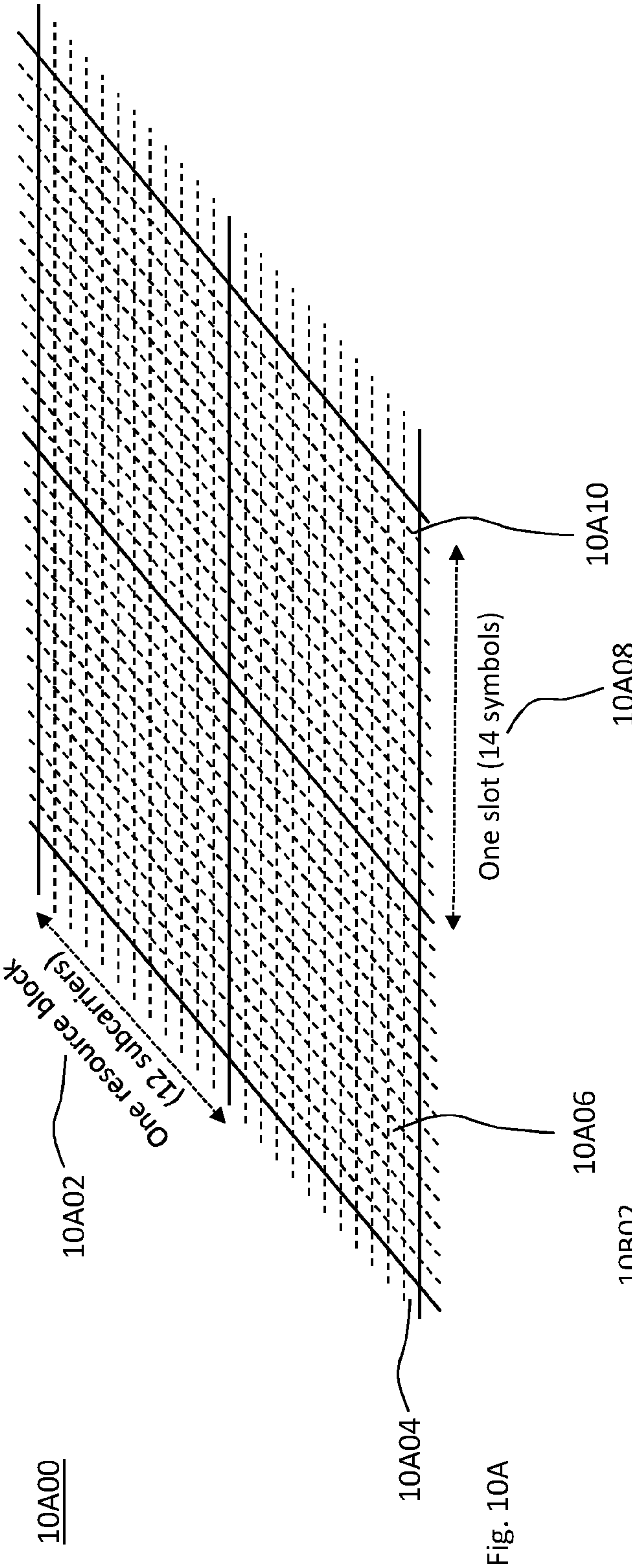
FIG. 10A schematically shows a physical resource grid of a 3GPP NR implementation.

FIG. 10A schematically illustrates a physical resource grid 10A00 for a 3GPP NR implementation of the technique.

The basic NR physical resource over an antenna port can be seen as a time-frequency grid as illustrated in FIG. 10A, where a resource block (RB) 10A02 in a 14-symbol slot 10A08 is shown. A RB 10A02 corresponds to 12 contiguous subcarriers 10A04 in the frequency domain. RBs 10A02 are numbered in the frequency domain, starting with 0 from one end of the system bandwidth. Each resource element (RE) 10A06 corresponds to one OFDM subcarrier during one OFDM symbol 10A10 interval. A slot 10A08 comprises 14 OFDM symbols 10A10.

Different subcarrier spacing values are supported in NR. The supported subcarrier spacing values (also referred to as different numerologies) are given by $\Delta f=(15\times 2^{\mu})$ kHz where $\mu \in (0,1,2,3,4)$. $\Delta f=15$ kHz is the basic (or reference) subcarrier spacing that is also used in LTE.

In the time domain, DL and UL transmissions in NR are organized into equally-sized subframes of 1 ms each similar to LTE. A subframe is further divided into multiple slots 10A08 of equal duration. The slot length for subcarrier spacing $\Delta f=(15\times 2^{\mu})$ kHz is $(\frac{1}{2})\mu$ ms. There is only one slot 10A08 per subframe for $\Delta f=15$ kHz, and a slot 10A08 consists of 14 OFDM symbols 10A10.

DL transmissions are dynamically scheduled, e.g., in each slot the gNB transmits DL control information (DCI) about which radio device (e.g., UE) data is to be transmitted to and which RBs in the current DL slot the data is transmitted on. This control information is conventionally transmitted in the first one or two OFDM symbols in each slot in NR. The control information is carried on the Physical Control Channel (PDCCH), and data is carried on the Physical Downlink Shared Channel (PDSCH). A radio device (e.g., a UE) first detects and decodes PDCCH and, if a PDCCH is decoded successfully, it (e.g., the UE) then decodes the corresponding PDSCH based on the DL assignment provided by decoded control information in the PDCCH.

In addition to PDCCH and PDSCH, there are also other channels and reference signals transmitted in the downlink, including synchronization signal blocks (SSBs), channel state information reference signals (CSI-RS), etc.

UL data transmissions, carried on Physical Uplink Shared Channel (PUSCH), can also be dynamically scheduled by the gNB by transmitting a DCI. The DCI (which is transmitted in the DL region) indicates a scheduling time offset so that the PUSCH is transmitted in a slot in the UL region.

Any embodiment may be implemented using a sidelink (SL) in NR for the D2D communication.

SL transmissions over NR are specified for Rel. 16. These are enhancements of the ProSe (PROximity-based SErvices) specified for LTE. Four new enhancements are particularly introduced to NR sidelink transmissions as follows:

- Support for unicast and groupcast transmissions are added in NR SL. For unicast and groupcast, the physical sidelink feedback channel (PSFCH) is introduced for a receiver radio device (e.g., a receiver UE) to reply the decoding status to a transmitter radio device (e.g., a transmitter UE).
- Grant-free transmissions, which are adopted in NR UL transmissions, are also provided in NR SL transmissions, to improve the latency performance.
- To alleviate resource collisions among different SL transmissions launched by different radio devices (e.g., different UEs), it enhances channel sensing and resource selection procedures, which also lead to a new design of PSCCH.
- To achieve a high connection density, congestion control and thus the quality of service (QOS) management is supported in NR SL transmissions.

To enable the above enhancements, new physical channels and reference signals (RSs) are introduced in NR (available in LTE before.):

- PSSCH (Physical Sidelink Shared Channel, SL version of PDSCH): The PSSCH is transmitted by a SL transmitter radio device (e.g., SL transmitter UE), which conveys SL transmission data, system information blocks (SIBs) for radio resource control (RRC) configuration, and a part of the sidelink control information (SCI).
- PSFCH (Physical Sidelink, SL version of PUCCH): The PSFCH is transmitted by a SL receiver radio device (e.g., a SL receiver UE) for unicast and groupcast, which conveys 1 bit information over 1 RB for the HARQ acknowledgement (ACK) and the negative ACK (NACK). In addition, channel state information (CSI) is carried in the medium access control (MAC) control element (CE) over the PSSCH instead of the PSFCH.
- PSCCH (Physical Sidelink Common Control Channel, SL version of PDCCH): When the traffic to be sent to a receiver radio device (e.g., a receiver UE) arrives at a transmitter radio device (e.g., a transmitter UE), a transmitter radio device (e.g., transmitter UE) should first send the PSCCH, which conveys a part of SCI (Sidelink Control information, SL version of DCI) to be decoded by any radio device (e.g., UE) for the channel sensing purpose, including the reserved time-frequency resources for transmissions, demodulation reference signal (DMRS) pattern and antenna port, etc.
- Sidelink Primary/Secondary Synchronization Signal (S-PSS/S-SSS): Similar DL transmissions in NR, in SL transmissions, primary and secondary synchronization signals (called S-PSS and S-SSS, respectively) are supported. Through detecting the S-PSS and S-SSS, a radio device (e.g., a UE) is able to identify the SL synchronization identity (SSID) from the radio device (e.g., UE) sending the S-PSS/S-SSS. Through detecting the S-PSS/S-SSS, a radio device (e.g., UE) is therefore able to know the characteristics of the radio device (e.g., UE) transmitting the S-PSS/S-SSS. A series of processes of acquiring timing and frequency synchronization together with SSIDs of radio devices (e.g., UEs) is called initial cell search. Note that the radio device (e.g., UE) sending the S-PSS/S-SSS may not be necessarily involved in SL transmissions, and a node (e.g., a UE and/or eNB and/or gNB) sending the S-PSS/S-SSS is called a synchronization source. There are 2 S-PSS sequences and 336 S-SSS sequences forming a total of 11A72 SSIDs in a cell.

Physical Sidelink Broadcast Channel (PSBCH): The PSBCH is transmitted along with the S-PSS/S-SSS as a synchronization signal/PSBCH block (SSB). The SSB has the same numerology as PSCCH/PSSCH on that carrier, and an SSB should be transmitted within the bandwidth of the configured BWP. The PSBCH conveys information related to synchronization, such as the direct frame number (DFN), indication of the slot and symbol level time resources for sidelink transmissions, in-coverage indicator, etc. The SSB is transmitted periodically at every 160 ms.

DMRS, phase tracking reference signal (PT-RS), channel state information reference signal (CSI-RS): These physical reference signals supported by NR DL/UL transmissions are also adopted by SL transmissions. Similarly, the PT-RS is only applicable for FR2 transmission.

Another new feature is the two-stage SL control information (SCI). This a version of the DCI for SL. Unlike the DCI, only part (first stage) of the SCI is sent on the PSCCH. This part is used for channel sensing purposes (including the reserved time-frequency resources for transmissions, demodulation reference signal (DMRS) pattern and antenna port, etc.) and can be read by all radio devices (e.g., UEs) while the remaining (second stage) scheduling and control information such as a 8-bits source identity (ID) and a 16-bits destination ID, NDI, RV and HARQ process ID is sent on the PSSCH to be decoded by the receiver radio device (e.g., UE).

Similar as for PROSE in LTE, NR SL transmissions have the following two modes of resource allocations:

Mode 1: SL resources are scheduled by a network node (e.g., gNB).

Mode 2: The radio device (e.g., UE) autonomously selects SL resources from a configured or preconfigured SL resource pool(s) based on the channel sensing mechanism.

For the in-coverage radio device (e.g., UE), a network node (e.g., gNB) can be configured to adopt Mode 1 or Mode 2. For the out-of-coverage radio device (e.g., UE), only Mode 2 can be adopted.

As in LTE, scheduling over the SL in NR is done in different ways for Mode 1 and Mode 2.

Mode 1 supports the following two kinds of grants, namely dynamic grants and configured grants.

Dynamic grant: When the traffic to be sent over SL arrives at a transmitter radio device (e.g., UE), this radio device (e.g., UE) should launch the four-message exchange procedure to request SL resources from a network node, e.g. gNB (SR on UL, grant, BSR on UL, grant for data on SL sent to the radio device, e.g., UE). During the resource request procedure, a network node (e.g., gNB) may allocate a SL radio network temporary identifier (SL-RNTI) to the transmitter radio device (e.g., UE). If this SL resource request is granted by a network node (e.g., gNB), then a network node (e.g., gNB) indicates the resource allocation for the PSCCH and the PSSCH in the downlink control information (DCI) conveyed by PDCCH with cyclic redundancy check (CRC) scrambled with the SL-RNTI. When a transmitter radio device (e.g., UE) receives such a DCI, a transmitter radio device (e.g., UE) can obtain the grant only if the scrambled CRC of DCI can be successfully solved by the assigned SL-RNTI. A transmitter radio device (e.g., UE) then indicates the time-frequency resources and the transmission scheme of the allocated PSSCH in the PSCCH, and launches the PSCCH and the PSSCH on the allocated resources for SL transmissions. When a grant is obtained from a network node (e.g., gNB), a transmitter radio device (e.g., UE) can only transmit a single transport block (TB). As a result, this kind of grant is suitable for traffic with a loose latency requirement.

Configured grant: For the traffic with a strict latency requirement, performing the four-message exchange procedure to request SL resources may induce unacceptable latency. In this case, prior to the traffic arrival, a transmitter radio device (e.g., UE) may perform the four-message exchange procedure and request a set of resources. If a grant can be obtained from a network node (e.g., gNB), then the requested resources are reserved in a periodic manner. Upon traffic arriving at a transmitter radio device (e.g., UE), this radio device (e.g., UE) can launch the PSCCH and the PSSCH on the upcoming resource occasion. This kind of grant is also known as grant-free transmissions.

In both dynamic grant and configured grant, a SL receiver radio device (e.g., UE) cannot receive the DCI since it is addressed to the transmitter radio device (e.g., UE), and therefore a receiver radio device (e.g., UE) should perform blind decoding to identify the presence of PSCCH and find the resources for the PSSCH through the SCI.

When a transmitter radio device (e.g., UE) launches the PSCCH, CRC is also inserted in the SCI without any scrambling.

In the Mode 2 resource allocation, when traffic arrives at a transmitter radio device (e.g., UE), this transmitter radio device (e.g., UE) should autonomously select resources for the PSCCH and the PSSCH. To further minimize the latency of the feedback HARQ ACK/NACK transmissions and subsequently retransmissions, a transmitter radio device (e.g., UE) may also reserve resources for PSCCH/PSSCH for retransmissions. To further enhance the probability of successful TB decoding at one shot and thus suppress the probability to perform retransmissions, a transmitter radio device (e.g., UE) may repeat the TB transmission along with the initial TB transmission. This mechanism is also known as blind retransmission. As a result, when traffic arrives at a transmitter radio device (e.g., UE), then this transmitter radio device (e.g., UE) may select resources for the following transmissions:

1) The PSSCH associated with the PSCCH for initial transmission and blind retransmissions.
2) The PSSCH associated with the PSCCH for retransmissions.

Since each transmitter radio device (e.g., UE) in SL transmissions should autonomously select resources for above transmissions, how to prevent different transmitter radio devices (e.g., UEs) from selecting the same resources turns out to be a critical issue in Mode 2. A particular resource selection procedure is therefore imposed to Mode 2 based on channel sensing. The channel sensing algorithm involves measuring reference signal received power (RSRP) on different subchannels and requires knowledge of the different radio devices (e.g., UEs) power levels of DMRS on the PSSCH or the DMRS on the PSCCH depending on the configuration. This information is known only after receiver SCI launched by (all) other radio devices (e.g., UEs). The sensing and selection algorithm may be rather complex.

The D2D communication may be based on or initiated by a discovery procedure.

There are D2D discovery procedures for detection of services and applications offered by other radio devices (e.g., UEs) in close proximity. This is part of LTE Release 12 and Release 13. The discovery procedure has two modes, mode A based on open announcements (broadcasts) and mode B, which is request/response. The discovery mechanism is controlled by the application layer (also referred to as ProSe). The discovery message is transmitted on the Physical Sidelink Discovery Channel (PSDCH), which is not available in NR. Also, there is a specific resource pool for announcement and monitoring of discovery messages. The discovery procedure can be used to detect radio devices (e.g., UEs) supporting certain services or applications before initiating direct communication.

The relayed radio communication through the relay radio device, e.g. device 200, may be implemented as a Layer 3 (L3) UE-to-Network relay.

In the TR 23.752 v0.3.0 clause 6.6, the layer-3 based UE-to-Network relay is described as further discussed in connection to FIG. 10B.

Figure 10B:
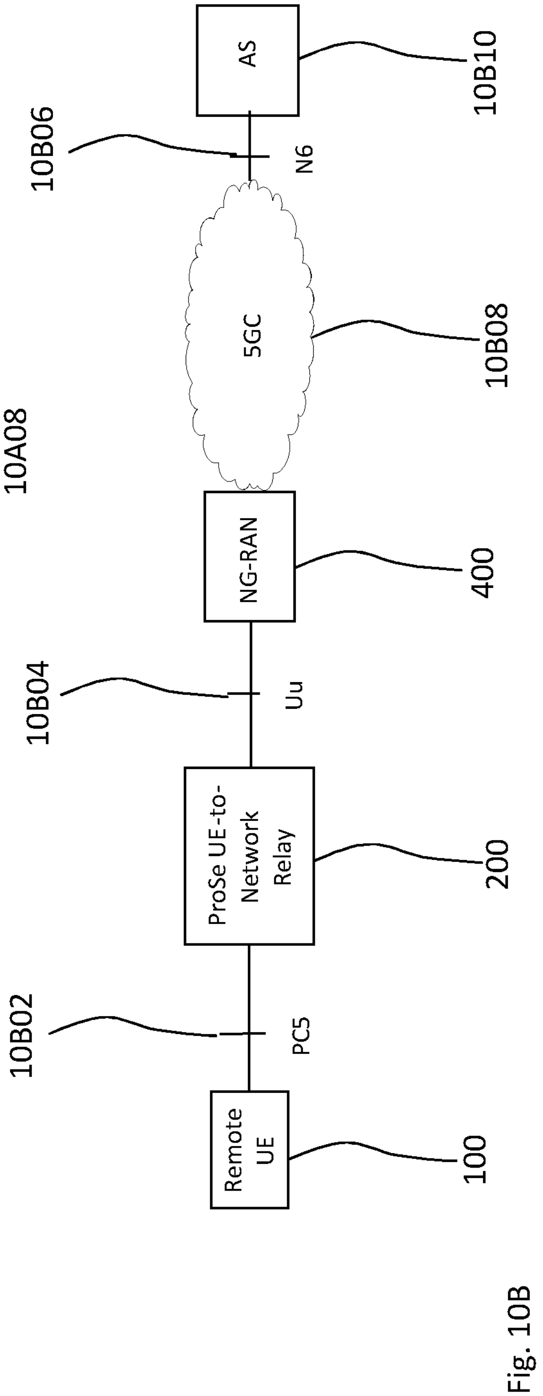
FIG. 10B schematically illustrates an architecture of a relayed radio communication using a relay radio device, e.g. according to the device of FIG. 2.

As shown in FIG. 10B, the ProSe 5G UE-to-Network Relay entity 200 provides the functionality to support connectivity to the network 100-NN, 10B08 for Remote UEs 100. It can be used for both public safety services and commercial services (e.g. interactive service).

A UE is considered to be a Remote UE 100 for a certain ProSe UE-to-Network relay 200 if it has successfully established a PC5 link 10B02 to this ProSe 5G UE-to-Network Relay 200. A Remote UE 100 can be located within NG-RAN 100-NN coverage or outside of NG-RAN 100-NN overage.

The ProSe 5G UE-to-Network Relay 200 shall relay unicast traffic (UL and DL) between the Remote UE 100 and the network 100-NN, 10B08, e.g. using the Uu interface 10B04. The ProSe UE-to-Network Relay 200 shall provide generic function that can relay any IP traffic.

The network may comprise an NG-RAN 100-NN, a 5G Core Network (5GC) 10B08 and an N6 link 10B06 to Access Stratum (AS) 10B10.

One-to-one Direct Communication is used between Remote UEs 100 and ProSe 5G UE-to-Network Relays 200 for unicast traffic as specified in solutions for Key Issue #2 in the TR 23.752 v0.3.0.

Figure 11A:
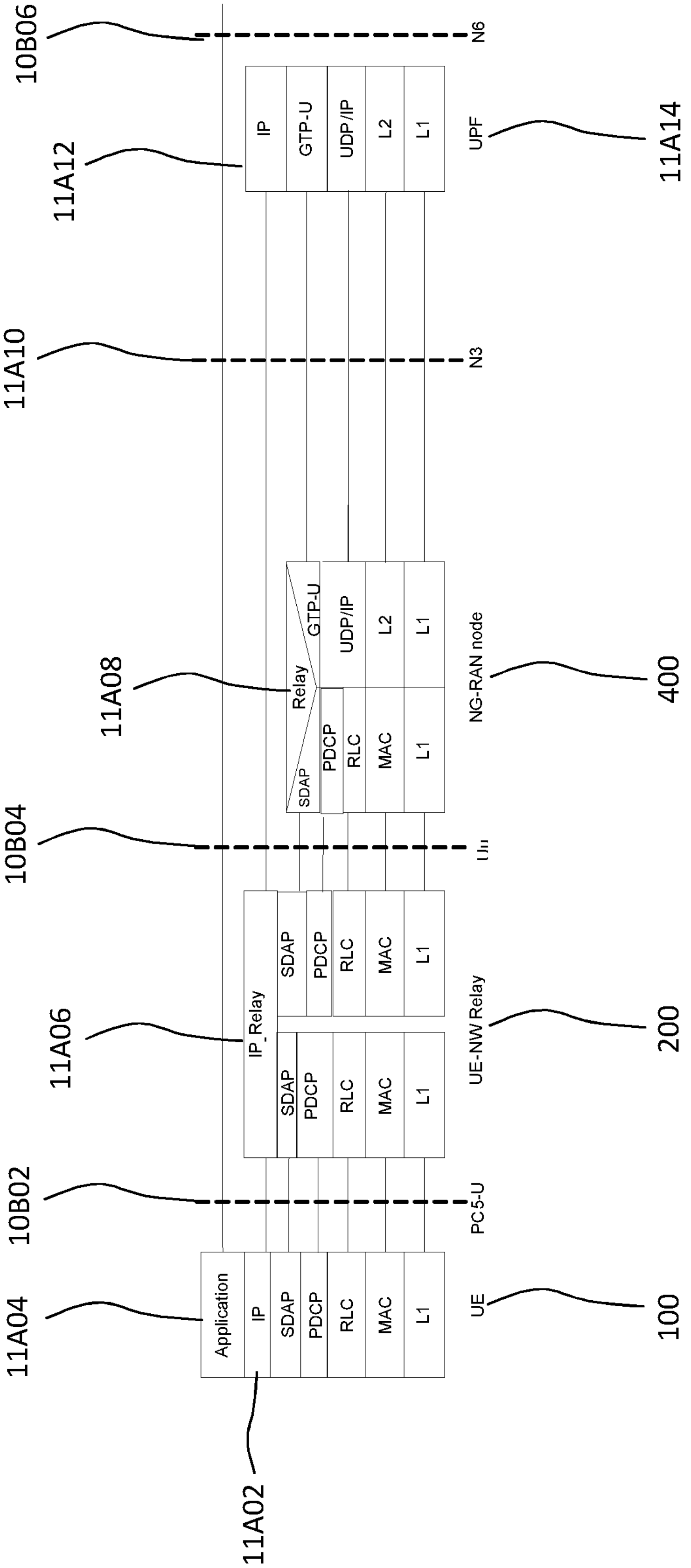
FIG. 11A schematically illustrates examples of protocol stacks for a L3 remote (RM) radio device-to-network relay.

FIG. 11A schematically illustrates examples of protocol stacks for a L3 UE-to-Network Relay, e.g., according to ProSe 5G UE-to-Network Relay specified in the 3GPP document TR 23.752 v0.3.0.

Hop-by-hop security may be provided in the PC5 link 10B02 and/or Uu link 10B04. If there are requirements beyond hop-by-hop security for protection of RM radio device traffic, security over IP layer 11A02, 11A06, 11A12 may be applied.

Further security details (integrity and privacy protection for RM radio device to network communication) will be specified in SA WG3.

A ProSe 5G UE-to-Network Relay capable radio device (e.g., UE) 100 may register to the network (if not already registered) and establish a PDU session enabling the necessary relay traffic, or it may need to connect to additional PDU session(s) or modify the existing PDU session in order to provide relay traffic towards RM radio device(s) 100 (e.g., UE(s)). At least in some embodiments, PDU session(s) supporting UE-to-Network Relay shall only be used for Remote ProSe UE(s) relay traffic.

In FIG. 11A, the network comprises a user plane function (UPF) at reference sign 11A14 with N3 link 11A10 to the network node 100-NN. The application layer 11A04 is an example of a transparent layer. Layers 11A06, 11A08 comprise an adaptation layer fort he relayed radio communication.

Herein below, an example of the protocol architecture supporting a L2 RL radio device (e.g., UE-to-Network Relay UE) 200 is provided in connection with FIG. 11B.

The L2 RL radio device (e.g., UE-to-Network Relay UE) 200 provides forwarding functionality that can relay any type of traffic over the PC5 link 10B02.

The L2 RL radio device (e.g., UE-to-Network Relay UE) 200 provides the functionality to support connectivity to the 5GS (e.g., NG-RAN 100-NN) for RM radio devices (e.g., Remote UEs) 100. A radio device (e.g., UE) is considered to be a RM radio device (e.g., Remote UE) 100 if it has successfully established a PC5 link 10B02 to the L2 RL radio device (e.g., UE-to-Network Relay UE) 200. A RM radio device (e.g., Remote UE) 100 can be located within NG-RAN 100-NN coverage or outside of NG-RAN 100-NN coverage.

Figure 11B:
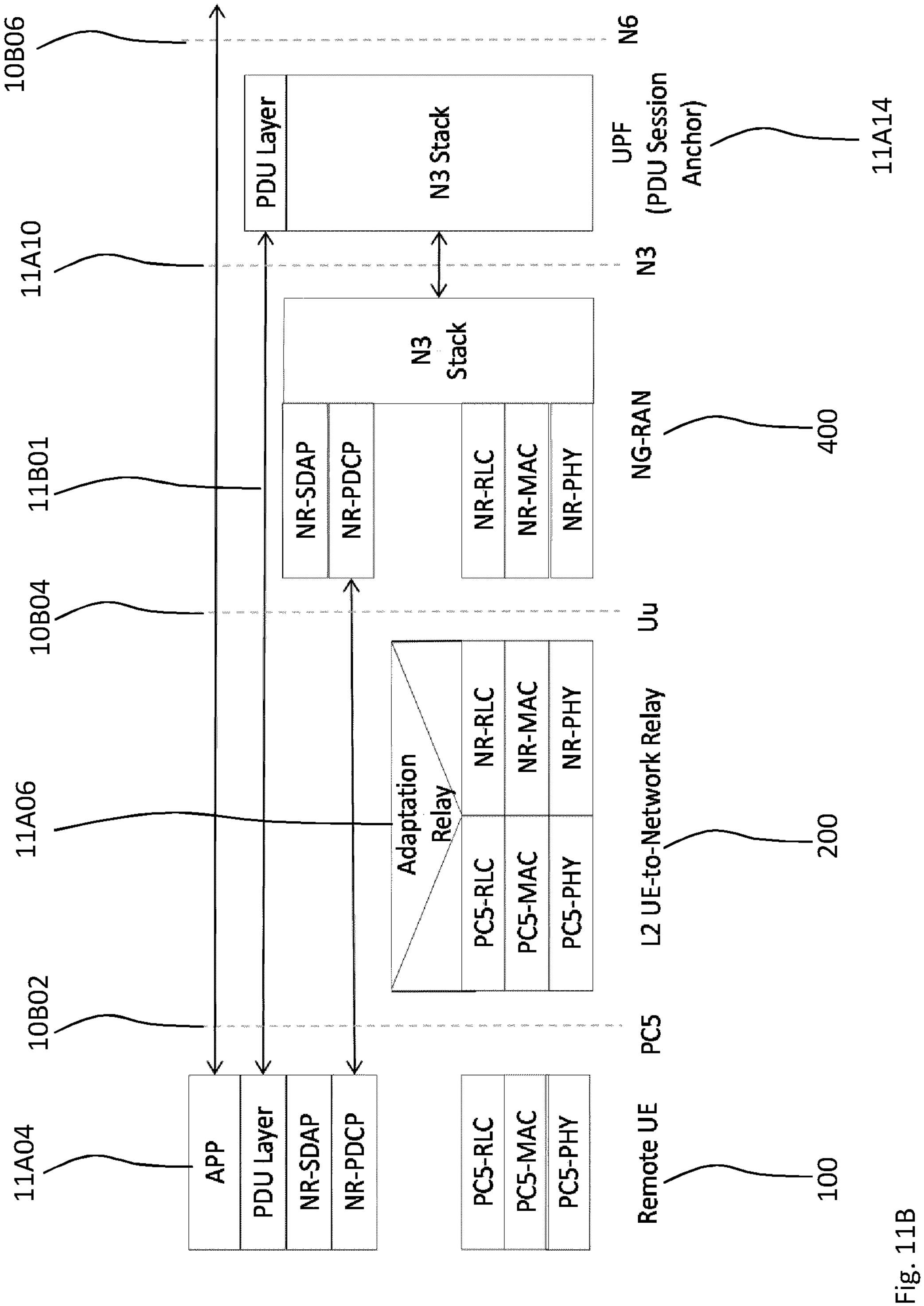
FIG. 11B schematically illustrates a user plane stack for an L2 relay (RL) radio device, the RAN, and an RM radio device, which may embody the devices of FIGS. 1 to 4.

FIG. 11B illustrates the protocol stack for the user plane transport according to the 3GPP document TR 23.752, version 0.3.0, related to a PDU session, including a Layer 2 RL radio device (e.g., UE-to-Network Relay UE) 200. The PDU layer 11B01 corresponds to the PDU carried between the RM radio device (e.g., Remote UE) 100 and the Data Network (DN), e.g. represented by the UPF 11A14 in FIG. 11B, over the PDU session. It is important to note that the two endpoints of the PDCP link are the RM radio device (e.g., Remote UE) and the network node (e.g., gNB) 100-NN. The relay function is performed below PDCP, e.g., a schematically depicted at reference sign 11A06. This means that data security is ensured between the RM radio device (e.g., Remote UE) 100 and the RAN and/or network node (e.g., gNB) 100-NN without exposing raw data at the RL radio device (e.g., UE-to-Network Relay UE) 200.

The adaptation relay layer 11A06 within the RL wireless device (e.g., UE-to-Network Relay UE) 200 can differentiate between signaling radio bearers (SRBs) and data radio bearers (DRBs) for a particular RM wireless device (e.g., Remote UE) 100. The adaption relay layer 11A06 is also responsible for mapping PC5 traffic (at reference sing 10B02) to one or more DRBs of the Uu interface at reference sing 10B04. The definition of the adaptation relay layer 11A06 is under the responsibility of RAN WG2.

Figure 11C:
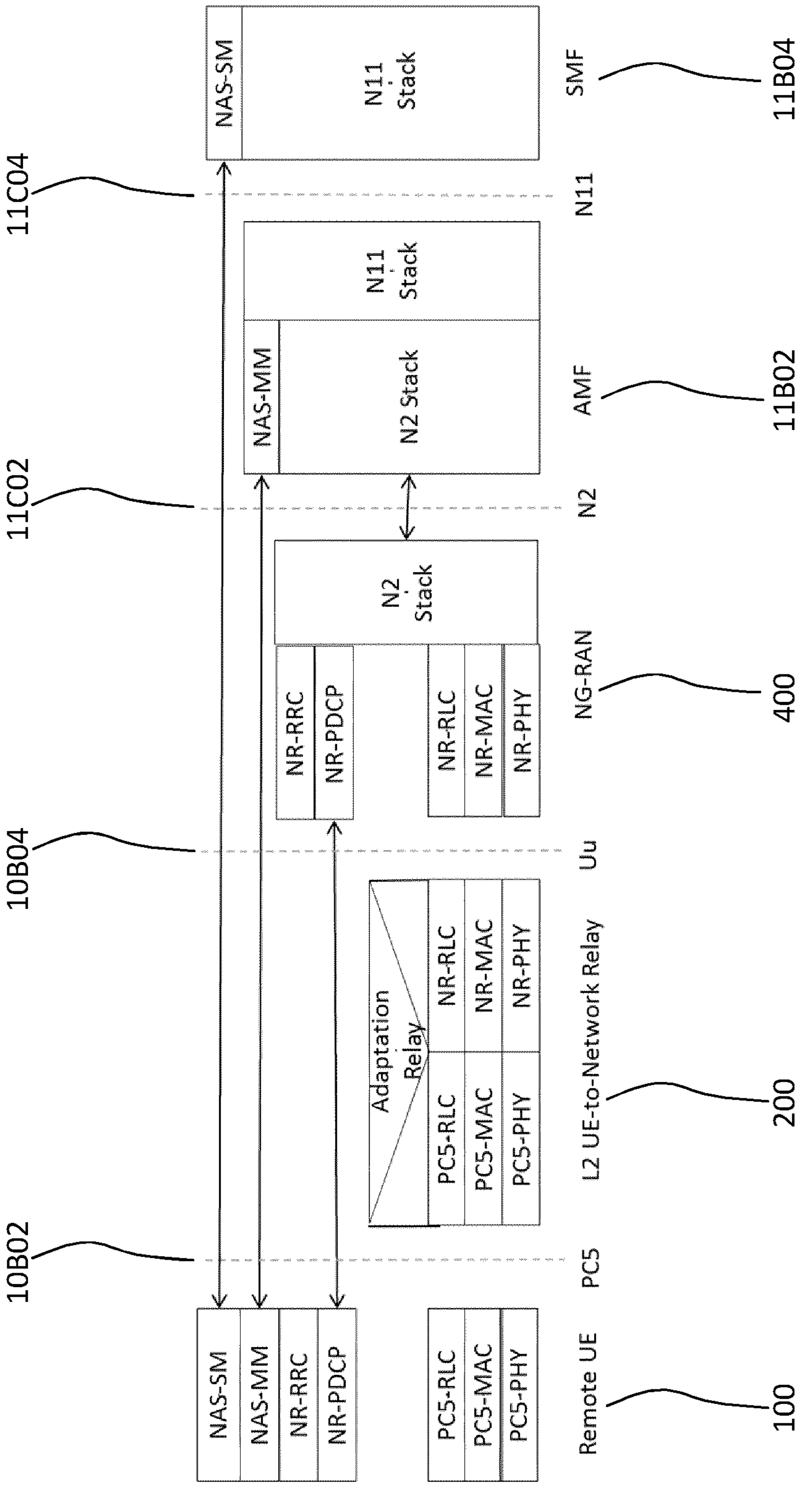
FIG. 11C schematically illustrates a control plane stack for an L2 RL radio device, the RAN, and an RM radio device, which may embody the devices of FIGS. 1 to 4.

FIG. 11C illustrates the protocol stack of the non-access stratum (NAS) connection according to the 3GPP document TR 23.752 v0.3.0 for the RM wireless device (e.g., Remote UE) 100 to the NAS-MM and NAS-SM components at reference sings 11B02 and 11B04, respectively. The NAS messages are transparently transferred between the RM wireless device (e.g., a Remote UE) 100 and 5G-RAN 100-NN over the Layer 2 RL wireless device 200 (e.g., a UE-to-Network Relay UE) using the following:

PDCP end-to-end connection where the role of the RL wireless device 200 (e.g., a UE-to-Network Relay UE) is to relay the PDUs over the signaling radio bear without any modifications.

N2 connection between the 5G-RAN 100-NN and AMF 11B02 over N2 at reference sign 11C02.

N3 connection between AMF 11B02 and SMF 11B04 over N11 at reference sign 11C04.

The role of the RL wireless device 200 (e.g., a UE-to-Network Relay UE) is to relay the PDUs from the signaling radio bearer without any modifications.

The methods and solutions disclosed in the following, are referring to the NR RAT but can be applied also to LTE RAT and any other RAT enabling the direct transmission between two (or more) nearby devices 100 and 200 without any loss of meaning.

In the following, sidelink (SL) relay refers to a communication that is generated by a remote UE 100 and is terminated at a gNB 400 (or another destination remote UE) via the use of an intermediate node called relay UE 200.

Furthermore, RM UE 100 may refer to the remote UE that needs to transmit and/or receive data (e.g., a data packet) from and/or to the gNB 400 or another UE (called target remote UE) via an intermediate mobile terminal or relay, which is referred to as RL UE 200.

The technique is described in a context of sidelink relaying, but this is just a non-limiting example. The technique may be applied in other scenarios with relaying or similar, assuming that there is a node 100 in the relayed wireless communication 902 with the network 900 (e.g., the network node 400) via another node 200.

One scenario which this technique is concerned about is the scenario where a remote UE 100 has (as a result of cell selection or reselection) selected a different cell 150 compared to that of the relay UE 200.

FIG. 9A schematically illustrates this scenario. In this scenario, the remote UE 100 has selected the first cell 150 and the relay UE 200 has selected the second cell 250. The relay UE 200 provides the relayed wireless (e.g., radio) connection for the remote UE 100. The relay UE 200 may provide the system information SI2 for the remote UE 100, which in this scenario would be the system information of the second cell 250.

FIG. 9B schematically illustrates a second scenario, in which the first network node 300 and the second network node 400 are identical. In other words, one network node of the (e.g., radio) access network 900 may provide radio access according to the first cell 150 and the second cell 250.

FIG. 9C schematically illustrates a third scenario, in which the relayed wireless (e.g., radio) communication comprises one or more intermediate UEs 210 or hops.

It will herein be described how the remote UE 100 acquires at least some part of the system information of the cell which is the "serving cell" of the remote UE 100. However, it should be noted that the remote UE 100 will in some cases not have a connection with that "serving cell", and in that way the "serving cell" may hence not be seen as actually "serving" the UE. But for the sake of readability the cell which the remote UE 100 has selected as a result of cell (re)selection may anyway be referred to as the "serving cell" of the remote UE 100.

Further, it will be said that that a UE (e.g., the remote UE 100) "acts" on PWS information. The PWS information may contain information, which the user of the device 100 shall be shown, such as a text message. In that case, "acting on" PWS information may mean that the UE 100 shows the information to the user. If the UE 100 does not act on the PWS information, it may be that the UE discards the PWS information or ignores it, etc.

A first set of family of embodiments is described in more detail, e.g., in which the remote UE 100 may acquire the PWS information as the SI1 from the system information of its serving cell 150. The detailed embodiments may be combined with any embodiment in the list of embodiments.

In one detailed embodiment, the remote UE 100 acquires PWS information of serving cell 150 (i.e., the first cell) of the remote UE 100 by reading the system information SI1 broadcast of the first cell 150. However, other system information SI2 may be acquired from the relay UE 200.

This may result in that the remote UE 100 applies some system information SI1 which comes from the first cell 150 (e.g. its serving cell) and some system information SI2 is received from the relay UE 200 (and hence may be coming from another cell (e.g. the second cell 250).

With this detailed embodiment, the remote UE 100 need not acquire other system information SI1 from first cell, aside the PWS information. This means that the remote UE 100 applies only a portion (or part) of the system information from the first cell 150, namely the SI1 or PWS information.

Please note that in order to acquire the portion (or part) of system information from first cell 150 and other system information from the first cell 150, the remote UE 100 needs to at least acquire the SIB1 of the first cell 150 (e.g., in order to check which SIBs are scheduled by cell A) and keep an updated and/or valid version of SIB1 in its memory.

The remote UE 100, which operates according to an embodiment of the technique, may therefore have two sets of system information (e.g., SI1 and SI2 or the system information necessary for acquiring SI1 and SI2), one for the first cell 100 and one for the second cell 200.

In one embodiment, the remote UE 100 may store the updated versions of SIB1 (e.g., for the first and second cells) in two different UE variables so to differentiate what is received by first cell 150 and by the second cell 250.

Yet, in an alternative solution, the remote UE 100 may acquire SIB1 from the first cell 150 only to check if PWS information are scheduled by the first cell 150, and then discard the SIB1 (e.g., after acquiring the PWS information or not). Since the remote UE 100 may not need to have always stored an updated and/or valid version of SIB1 from first cell 150, the remote UE 100 may acquire the SIB1 periodically (e.g., with the use of the timer that is configured by the network or by the UE itself).

Any aspect of the technique may be implemented as a method of handling multiple (e.g., two) sets of PWS information It may be so that the relay UE 200 provides the SI2 (e.g., the PWS information) to the remote UE 100. For example, the relay UE 200 may provide all system information it has acquired to the remote UE 100. In case the remote UE 100 receives the PWS information from the relay UE 200, the remote UE 100 may have two sets of PWS information. Below it is described how the remote UE 100 may act in such cases.

In one detailed embodiment, the remote UE 100 discards PWS information in the SI2 received 504 from the relay UE 200. For example, the PWS information may be applicable to a certain location, for example a certain cell (e.g., the second cell 250). If the remote UE 100 is not in that cell, the PWS information is not applicable to the remote UE 100. This embodiment ensures that the remote UE 100 does not act on system information SI2 that is not applicable to itself.

Alternatively or in addition, the remote UE 100 may conditionally discard the PWS information in the SI2 received 504 from the relay UE 200. For example, the remote UE 100 only discards the PWS information if the remote UE 100 has a different serving cell 150 than the relay UE 200. In case the remote UE is out of coverage, and hence, not been able to select any cell from which it can received PWS information, the remote UE 100 may in this case accept and/or apply and/or act on the PWS information in the SI2 received 504 from the relay UE 200, e.g., even if the remote UE 100 and the relay UE 200 have not selected the same cell (as in this case the remote UE has not selected, or has not been able to select, any cell.

In one detailed embodiment, the remote UE 100 may act on both sets of PWS information (e.g., the PWS information comprised in SI1 and SI2). This means that the example remote UE 100 (e.g., in any one of the FIGS. 9A to 9C) may act on PWS information it receives 502 from the first cell 150 and may act on PWS information it receives 504 from the second cell 250.

The remote UE 100 may apply different behaviors for different types of PWS information. For example, the remote UE 100 may apply one behavior (e.g. act on both sets of PWS information) for ETWS information, and/or the remote UE 100 may discard CMAS information received from the relay UE.

A second set or family of detailed embodiments is described, e.g., in which the remote UE 100 receives the SI1 or the PWS information (e.g., comprised in the SI1) for the first cell 150 (e.g., its serving cell) via the relay UE 200 and/or in the relayed wireless communication 902.

According to this detailed embodiment, the remote UE 100 receives the PWS information relevant to the first cell 150 (e.g., its serving cell, in any one of the FIGS. 9A to 9C). The remote UE 100 receives (e.g., acquires) this information in the step 502 via the relay UE 200, e.g., instead of receiving this information directly from the first cell 150.

In one detailed embodiment, the remote UE 100, when establishing a sidelink relay path 902, shares with the relay UE 200 the cell ID of the first cell 150 (e.g., its serving cell). The relay UE 200 may forward this cell ID to the second cell 250 (e.g., its serving cell). Once acquired this information, the serving cell 250 of the relay UE 200 may request to the first (e.g., serving) cell 150 of the remote UE 100 to forward any PWS information, if any. This may means that if cell A has PWS information to send, it will broadcast these to the UE under its coverage, but it will also send the same PWS information to the cell B, so that cell B can send such PWS indication to the remote UE via the relay UE. When the remote UE is not involved anymore in any relay transmission with the relay UE, the serving cell of the relay UE (e.g., cell B) may send another indication to the serving cell of the remote UE (e.g., cell A) to stop sending any PWS information.

The PWS information between first cell 150 and second cell 250 may be exchanged by using X2 and/or Xn signaling or via the inter-node RRC messages.

Furthermore, the remote UE 100 may send the ID of its serving cell (e.g., cell A) directly to the serving cell of the relay UE (e.g., by using a new of an existing RRC message sent via SRB0) or may send it via the relay UE.

In another detailed embodiment, if the relay UE 200 receives two PWS information in the SI1 and the SI2, respectively, e.g., one coming from the first cell 150 and one coming from cell 250) to be delivered to the remote UE 100 by the second cell 250 (e.g., its serving cell), the relay UE 200 may perform at least one of the following actions.

According to first action, the PWS information or SI2 coming from the second cell 250 is discarded. Alternatively or in addition, the relay UE 200 transmits to the remote UE 100 only the PWS information in the SI1 and/or coming from the first cell 150.

According to second action, the relay UE 200 may merge the PWS information in the SI1 and the SI2 and/or coming from the first cell 150 and the second cell 250 in a (e.g., unique or non-redundant and/or consistent) PWS information. The relay UE 200 may transmit it to the remote UE 100.

According to a third action, the relay UE 200 may transmit individually both PWS information (in the SI1 and in the SI2 and/or coming from the first cell 150 and from the second cell 250) to the remote UE 100.

Optionally, the relay UE 200 may be configured to not act on the SI1 and/or the PWS information which it relays to the remote UE 100.

Figure 12:
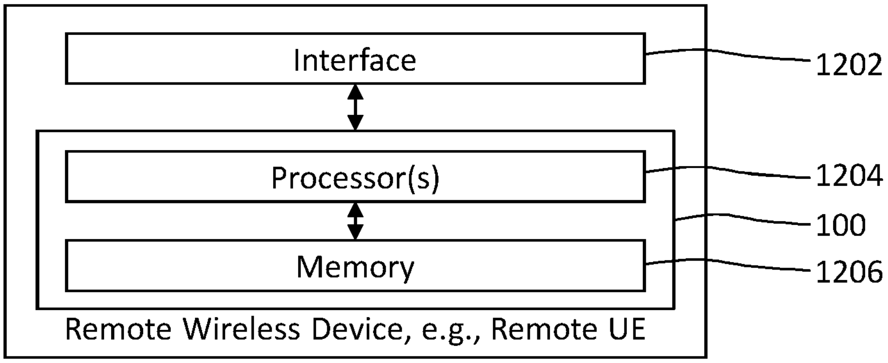
FIG. 12 shows a schematic block diagram of a RM radio device embodying the device of FIG. 1.

FIG. 12 shows a schematic block diagram for an embodiment of the device 100. The device 100 comprises processing circuitry, e.g., one or more processors 1204 for performing the method 500 and memory 1206 coupled to the processors 1204. For example, the memory 1206 may be encoded with instructions that implement at least one of the modules 102 and 104.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1206, UE functionality. For example, the one or more processors 1204 may execute instructions stored in the memory 1206. Such functionality may include providing various features and steps discussed herein, including any of the benefits disclosed herein. The expression "the device being operative to perform an action" may denote the device 100 being configured to perform the action.

As schematically illustrated in FIG. 12, the device 100 may be embodied by a wireless device 1200, e.g., functioning as remote UE. The UE 1200 comprises a radio interface 1202 coupled to the device 100 for radio communication with one or more receiving stations, e.g., functioning as a receiving base station or a receiving UE.

Figure 13:
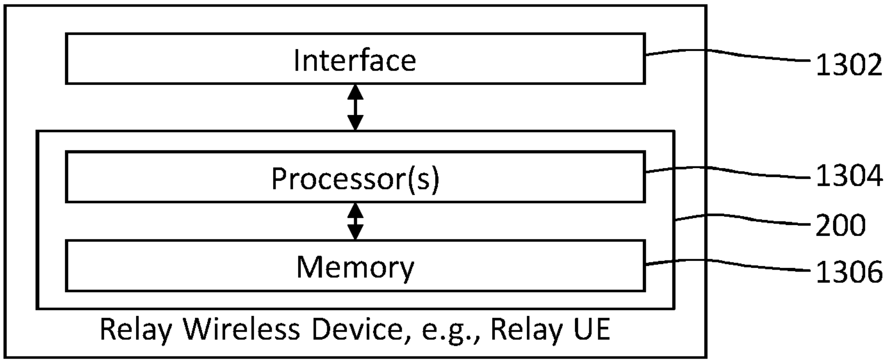
FIG. 13 shows a schematic block diagram of a RL radio device embodying the device of FIG. 2.

FIG. 13 shows a schematic block diagram for an embodiment of the device 200. The device 200 comprises processing circuitry, e.g., one or more processors 1304 for performing the method 600 and memory 1306 coupled to the processors 1304. For example, the memory 1306 may be encoded with instructions that implement at least one of the modules 202 and 204.

The one or more processors 1304 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1306, relay functionality. For example, the one or more processors 1304 may execute instructions stored in the memory 1306. Such functionality may include providing various features and steps discussed herein, including any of the benefits disclosed herein. The expression "the device being operative to perform an action" may denote the device 200 being configured to perform the action.

As schematically illustrated in FIG. 13, the device 200 may be embodied by a relay wireless device 1300, e.g., functioning as a relay UE. The relay wireless device 1300 comprises a radio interface 1302 coupled to the device 200 for radio communication with one or more transmitting stations, e.g., functioning as a transmitting base station or a transmitting UE.

Figure 14:
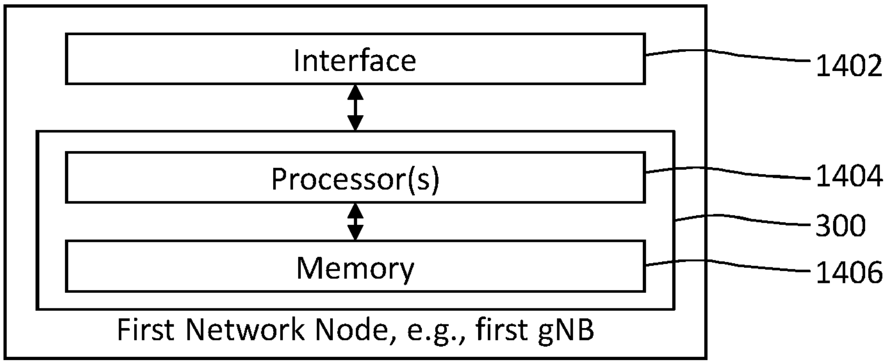
FIG. 14 shows a schematic block diagram of a first network node embodying the device of FIG. 3.

FIG. 14 shows a schematic block diagram for an embodiment of the device 300. The device 300 comprises processing circuitry, e.g., one or more processors 1404 for performing the method 700 and memory 1406 coupled to the processors 1404.

For example, the memory 1406 may be encoded with instructions that implement at least one of the modules 302 and 304.

The one or more processors 1404 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 300, such as the memory 1406, network node functionality. For example, the one or more processors 1404 may execute instructions stored in the memory 1406. Such functionality may include providing various features and steps discussed herein, including any of the benefits disclosed herein. The expression "the device being operative to perform an action" may denote the device 300 being configured to perform the action.

As schematically illustrated in FIG. 14, the device 300 may be embodied by a network node 1400, e.g., functioning as the first network node. The network node 1400 comprises a radio interface 1402 coupled to the device 100 for radio communication with one or more stations, e.g., functioning as a base station or a UE.

Figure 15:
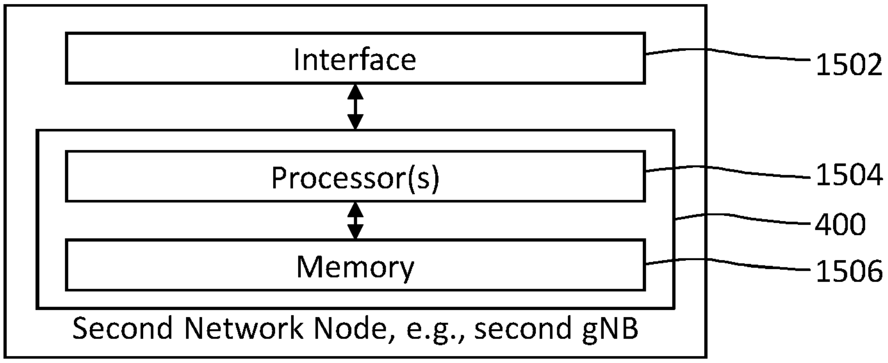
FIG. 15 shows a schematic block diagram of a second network node embodying the device of FIG. 4.

FIG. 15 shows a schematic block diagram for an embodiment of the device 400. The device 400 comprises processing circuitry, e.g., one or more processors 1504 for performing the method 800 and memory 1506 coupled to the processors 1504. For example, the memory 1506 may be encoded with instructions that implement at least one of the modules 402 and 404.

The one or more processors 1504 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1506, network node functionality. For example, the one or more processors 1504 may execute instructions stored in the memory 1506. Such functionality may include providing various features and steps discussed herein, including any of the benefits disclosed herein. The expression "the device being operative to perform an action" may denote the device 400 being configured to perform the action.

As schematically illustrated in FIG. 15, the device 400 may be embodied by a network node 1500, e.g., functioning as a second network node. The network node 1500 comprises a radio interface 1502 coupled to the device 400 for (e.g., radio) communication with one or more stations, e.g., functioning as a base station or a UE.

Figure 16:
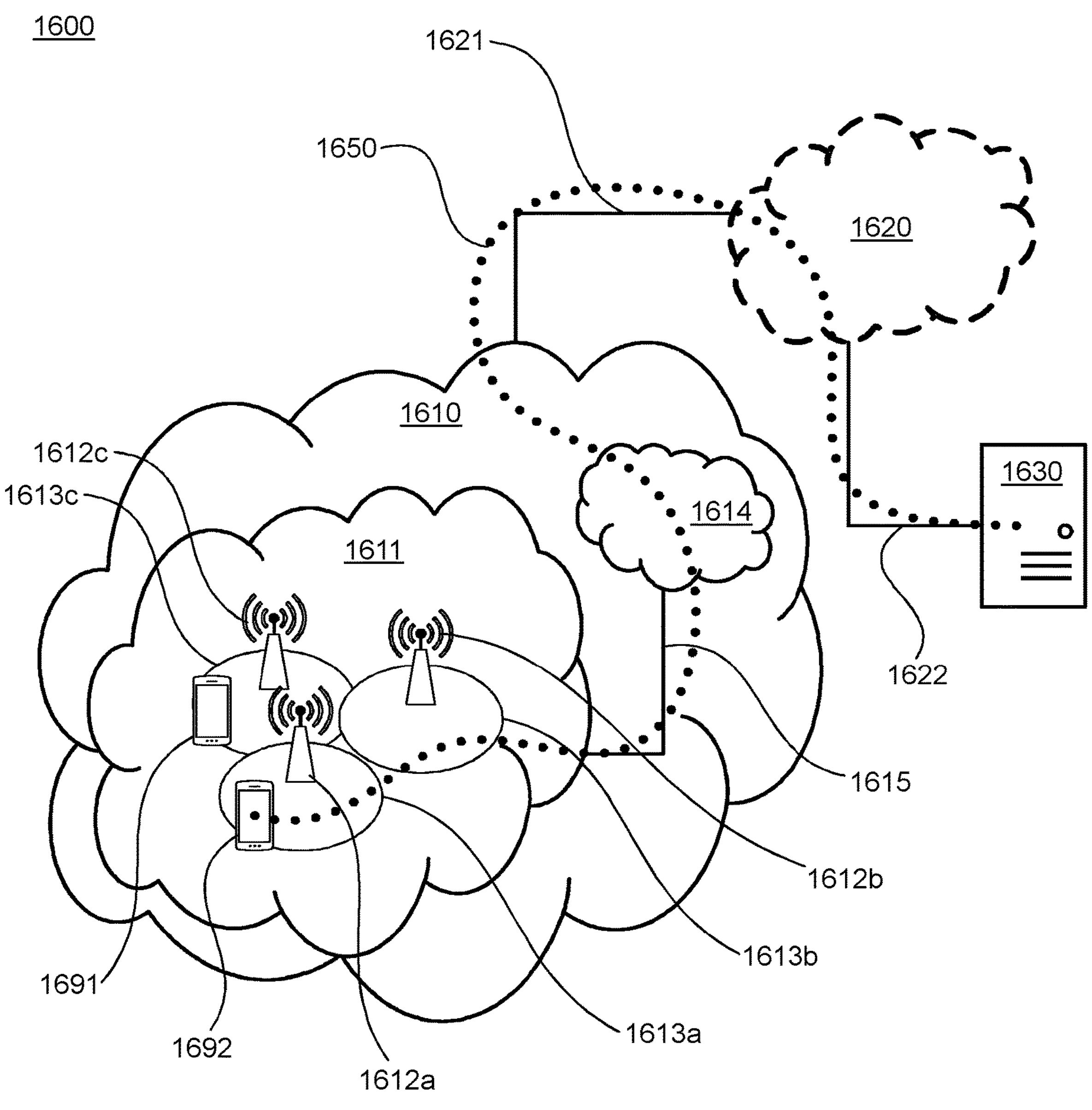
FIG. 16 schematically illustrates an example telecommunication network connected via an intermediate network to a host computer.

With reference to FIG. 16, in accordance with an embodiment, a communication system 1600 includes a telecommunication network 1610, such as a 3GPP-type cellular network, which comprises an access network 1611, such as a radio access network, and a core network 1614. The access network 1611 comprises a plurality of base stations 1612*a*, 1612*b*, 1612*c*, such as NBs, eNBs, gNBs or other types of wireless access points, each defining a corresponding coverage area 1613*a*, 1613*b*, 1613*c*. Each base station 1612*a*, 1612*b*, 1612*c* is connectable to the core network 1614 over a wired or wireless connection 1615. A first user equipment (UE) 1691 located in coverage area 1613*c* is configured to wirelessly connect to, or be paged by, the corresponding base station 1612*c*. A second UE 1692 in coverage area 1613*a* is wirelessly connectable to the corresponding base station 1612*a*. While a plurality of UEs 1691, 1692 are illustrated in this example, the disclosed embodiments are equally applicable to a situation where a sole UE is in the coverage area or where a sole UE is connecting to the corresponding base station 1612.

Any of the base stations 1612 may embody the device 300 and/or 400. Alternatively or in addition, any one of the UEs 1691, 1692 may embody the device 100 and/or 200.

The telecommunication network 1610 is itself connected to a host computer 1630, which may be embodied in the hardware and/or software of a standalone server, a cloud-implemented server, a distributed server or as processing resources in a server farm. The host computer 1630 may be under the ownership or control of a service provider, or may be operated by the service provider or on behalf of the service provider. The connections 1621, 1622 between the telecommunication network 1610 and the host computer 1630 may extend directly from the core network 1614 to the host computer 1630 or may go via an optional intermediate network 1620. The intermediate network 1620 may be one of, or a combination of more than one of, a public, private or hosted network; the intermediate network 1620, if any, may be a backbone network or the Internet; in particular, the intermediate network 1620 may comprise two or more sub-networks (not shown).

The communication system 1600 of FIG. 16 as a whole enables connectivity between one of the connected UEs 1691, 1692 and the host computer 1630. The connectivity may be described as an over-the-top (OTT) connection 1650. The host computer 1630 and the connected UEs 1691, 1692 are configured to communicate data and/or signaling via the OTT connection 1650, using the access network 1611, the core network 1614, any intermediate network 1620 and possible further infrastructure (not shown) as intermediaries. The OTT connection 1650 may be transparent in the sense that the participating communication devices through which the OTT connection 1650 passes are unaware of routing of uplink and downlink communications. For example, a base station 1612 need not be informed about the past routing of an incoming downlink communication with data originating from a host computer 1630 to be forwarded (e.g., handed over) to a connected UE 1691. Similarly, the base station 1612 need not be aware of the future routing of an outgoing uplink communication originating from the UE 1691 towards the host computer 1630.

By virtue of the method 500 and/or 600 being performed by any one of the UEs 1691 or 1692 and/or the method 700 and/or 800 by any one of the network nodes (e.g., base stations) 1612, the performance or range of the OTT connection 1650 can be improved, e.g., in terms of increased throughput and/or reduced latency. More specifically, the host computer 1630 may indicate (e.g., on an application layer) to the RAN 900 or the relay wireless device 200 (e.g. a relay radio device) or the remote wireless device 100 (e.g., a remote radio device) the PWS information.

Example implementations, in accordance with an embodiment of the UE, base station and host computer discussed in the preceding paragraphs, will now be described with reference to FIG. 17. In a communication system 1700, a host computer 1710 comprises hardware 1715 including a communication interface 1716 configured to set up and maintain a wired or wireless connection with an interface of a different communication device of the communication system 1700. The host computer 1710 further comprises processing circuitry 1718, which may have storage and/or processing capabilities. In particular, the processing circuitry 1718 may comprise one or more programmable processors, application-specific integrated circuits, field programmable gate arrays or combinations of these (not shown) adapted to execute instructions. The host computer 1710 further comprises software 1711, which is stored in or accessible by the host computer 1710 and executable by the processing circuitry 1718. The software 1711 includes a host application 1712. The host application 1712 may be operable to provide a service to a remote user, such as a UE 1730 connecting via an OTT connection 1750 terminating at the UE 1730 and the host computer 1710. In providing the service to the remote user, the host application 1712 may provide user data, which is transmitted using the OTT connection 1750. The user data may depend on the location of the UE 1730. The user data may comprise auxiliary information or precision advertisements (also: ads) delivered to the UE 1730. The location may be reported by the UE 1730 to the host computer, e.g., using the OTT connection 1750, and/or by the base station 1720, e.g., using a connection 1760.

The communication system 1700 further includes a base station 1720 provided in a telecommunication system and comprising hardware 1725 enabling it to communicate with the host computer 1710 and with the UE 1730. The hardware 1725 may include a communication interface 1726 for setting up and maintaining a wired or wireless connection with an interface of a different communication device of the communication system 1700, as well as a radio interface 1727 for setting up and maintaining at least a wireless connection 1770 with a UE 1730 located in a coverage area (not shown in FIG. 17) served by the base station 1720. The communication interface 1726 may be configured to facilitate a connection 1760 to the host computer 1710. The connection 1760 may be direct, or it may pass through a core network (not shown in FIG. 17) of the telecommunication system and/or through one or more intermediate networks outside the telecommunication system. In the embodiment shown, the hardware 1725 of the base station 1720 further includes processing circuitry 1728, which may comprise one or more programmable processors, application-specific integrated circuits, field programmable gate arrays or combinations of these (not shown) adapted to execute instructions. The base station 1720 further has software 1721 stored internally or accessible via an external connection.

The communication system 1700 further includes the UE 1730 already referred to. Its hardware 1735 may include a radio interface 1737 configured to set up and maintain a wireless connection 1770 with a base station serving a coverage area in which the UE 1730 is currently located. The hardware 1735 of the UE 1730 further includes processing circuitry 1738, which may comprise one or more programmable processors, application-specific integrated circuits, field programmable gate arrays or combinations of these (not shown) adapted to execute instructions. The UE 1730 further comprises software 1731, which is stored in or accessible by the UE 1730 and executable by the processing circuitry 1738. The software 1731 includes a client application 1732. The client application 1732 may be operable to provide a service to a human or non-human user via the UE 1730, with the support of the host computer 1710. In the host computer 1710, an executing host application 1712 may communicate with the executing client application 1732 via the OTT connection 1750 terminating at the UE 1730 and the host computer 1710. In providing the service to the user, the client application 1732 may receive request data from the host application 1712 and provide user data in response to the request data. The OTT connection 1750 may transfer both the request data and the user data. The client application 1732 may interact with the user to generate the user data that it provides.

Figure 17:
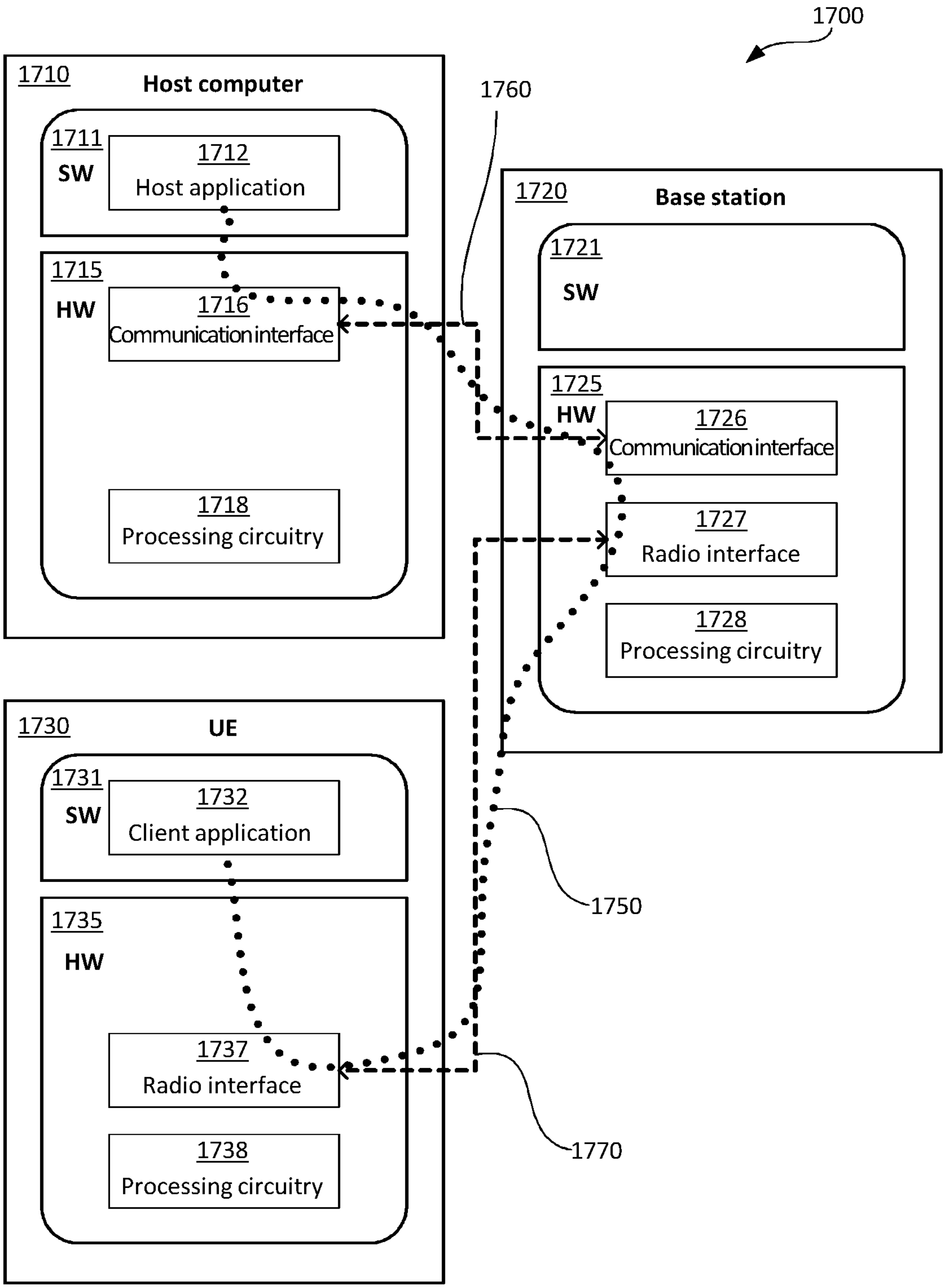
FIG. 17 shows a generalized block diagram of a host computer communicating via a base station or radio device functioning as a gateway with a user equipment over a partially wireless connection.

It is noted that the host computer 1710, base station 1720 and UE 1730 illustrated in FIG. 17 may be identical to the host computer 1630, one of the base stations **1612*a*, 1612*b*, 1612*c* and one of the UEs 1691, 1692 of FIG. 16, respectively. This is to say, the inner workings of these entities may be as shown in FIG. 17, and, independently, the surrounding network topology may be that of FIG. 16**.

In FIG. 17, the OTT connection 1750 has been drawn abstractly to illustrate the communication between the host computer 1710 and the UE 1730 via the base station 1720, without explicit reference to any intermediary devices and the precise routing of messages via these devices. Network infrastructure may determine the routing, which it may be configured to hide from the UE 1730 or from the service provider operating the host computer 1710, or both. While the OTT connection 1750 is active, the network infrastructure may further take decisions by which it dynamically changes the routing (e.g., on the basis of load balancing consideration or reconfiguration of the network).

The wireless connection 1770 between the UE 1730 and the base station 1720 is in accordance with the teachings of the embodiments described throughout this disclosure. One or more of the various embodiments improve the performance of OTT services provided to the UE 1730 using the OTT connection 1750, in which the wireless connection 1770 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1750 between the host computer 1710 and UE 1730, in response to variations in the measurement results. The measurement procedure and/or the network functionality for reconfiguring the OTT connection 1750 may be implemented in the software 1711 of the host computer 1710 or in the software 1731 of the UE 1730, or both. In embodiments, sensors (not shown) may be deployed in or in association with communication devices through which the OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of the OTT connection 1750 may include message format, retransmission settings, preferred routing etc.; the reconfiguring need not affect the base station 1720, and it may be unknown or imperceptible to the base station 1720. Such procedures and functionalities may be known and practiced in the art. In certain embodiments, measurements may involve proprietary UE signaling facilitating the host computer's 1710 measurements of throughput, propagation times, latency and the like. The measurements may be implemented in that the software 1711, 1731 causes messages to be transmitted, in particular empty or "dummy" messages, using the OTT connection 1750 while it monitors propagation times, errors etc.

Figure 18:
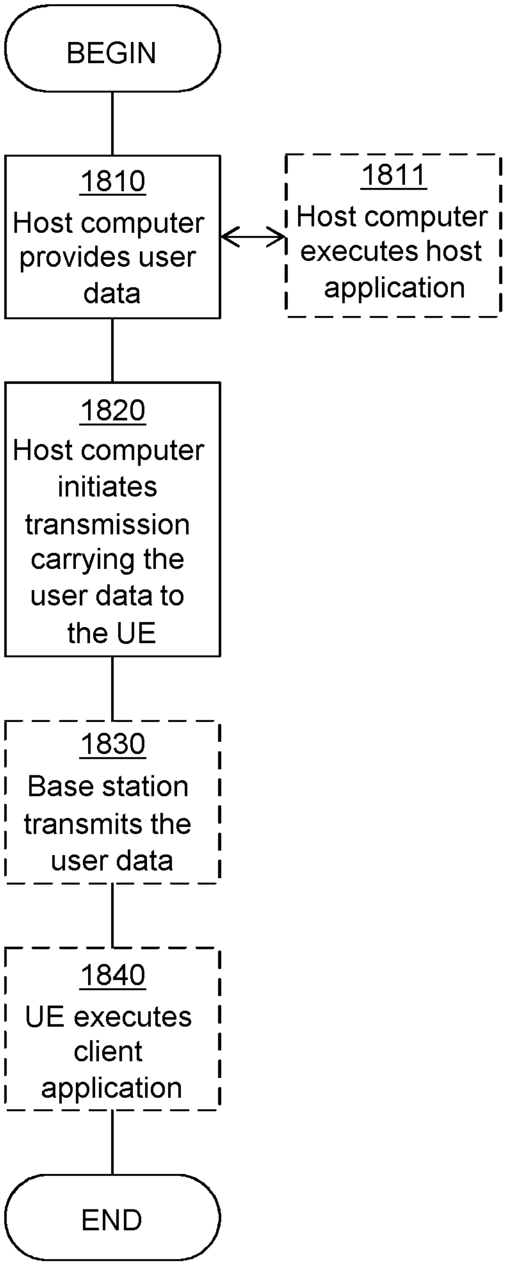
FIGS. 18 and 19 show flowcharts for methods implemented in a communication system including a host computer, a base station or radio device functioning as a gateway and a user equipment.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this paragraph. In a first step 1810 of the method, the host computer provides user data. In an optional substep 1811 of the first step 1810, the host computer provides the user data by executing a host application. In a second step 1820, the host computer initiates a transmission carrying the user data to the UE. In an optional third step 1830, the base station transmits to the UE the user data which was carried in the transmission that the host computer initiated, in accordance with the teachings of the embodiments described throughout this disclosure. In an optional fourth step 1840, the UE executes a client application associated with the host application executed by the host computer.

Figure 19:
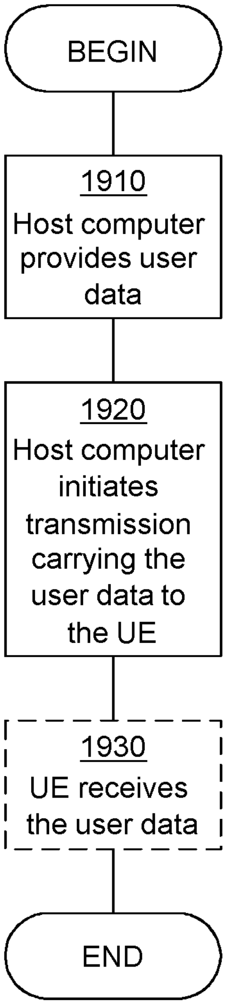

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this paragraph. In a first step 1910 of the method, the host computer provides user data. In an optional substep (not shown) the host computer provides the user data by executing a host application. In a second step 1920, the host computer initiates a transmission carrying the user data to the UE. The transmission may pass via the base station, in accordance with the teachings of the embodiments described throughout this disclosure. In an optional third step 1930, the UE receives the user data carried in the transmission.

As has become apparent from above description, at least some embodiments of the technique allow a UE to not miss relevant PWS information and/or ensure that the UE is not getting irrelevant PWS information.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following embodiments in the list of claims.

The invention claimed is:

1. A method performed by a remote wireless device in relayed wireless communication with a second cell of an access network, wherein the relayed wireless communication is relayed through a relay wireless device located in the second cell while the remote wireless device is located in a first cell of the access network other than the second cell, the method comprising or initiating the steps of:

receiving system information, SI1, of the first cell comprising public warning system, PWS, information relevant to the first cell, via the relay wireless device through a sidelink between the remote wireless device and the relay wireless device, wherein the SI1 is received responsive to the remote wireless device reporting a cell identity, cell ID, of the first cell to the relay wireless device to trigger delivery of the SI1; and receiving system information, SI2, of the second cell comprising public warning system, PWS, information relevant to the second cell, the method further comprising or initiating one of the steps of:

discarding the PWS information relevant to the second cell if the SI1 comprises PWS information relevant to the first cell, and if at least one of the following applies:

the PWS information relevant to the first cell in the SI1 is not older than the SI2 or the PWS information relevant to the second cell in the SI2, and/or the SI1 or the PWS information relevant to the first cell in the SI1 is not outdated; or acting on the PWS information relevant to the second cell if the SI1 does not comprise PWS information relevant to the first cell, or if at least one of the following applies:

the SI1 or the PWS information relevant to the first cell in the SI1 is older than the SI2 or the PWS information relevant to the second cell in the SI2, and/or the SI1 or the PWS information relevant to the first cell in the SI1 is outdated.

2. The method of claim 1, wherein at least one of:

the SI2 is indicative of an access stratum, AS, of the second cell;

the SI2 is indicative of a non-access stratum, NAS, of a core network of the second cell;

the SI2 comprises a master information block, MIB, of the second cell; and the SI2 comprises at least one of a system information block 1, SIB1, of the second cell, SIB2 of the second cell, SIB3 of the second cell, SIB4 of the second cell, SIB5 of the second cell, SIB11 of the second cell, SIB12 of the second cell, SIB13 of the second cell, and SIB14 of the second cell.

3. The method of claim 1, wherein the SI1 is incomplete or partial system information of the first cell, and/or wherein the remote wireless device applies the SI1 incompletely or partially.

4. The method of claim 1, wherein the remote wireless device acts on both PWS information in the SI1 and PWS information in the SI2.

5. The method of claim 1, wherein the remote wireless device applies a portion of the SI1 and a portion of the SI2.

6. The method of claim 1, wherein the method further comprising or initiating the step of selectively acting on and discarding the PWS information relevant to the second cell, depending on a type of the PWS information relevant to the second cell, optionally the type including at least one of a Commercial Mobile Alert System, CMAS; an Earthquake and Tsunami Warning System, ETWS; a Wireless Emergency Alert, WEA; and a Cell Broadcast Service, CBS.

7. The method of claim 1, wherein the SI2 is received from the second cell in the relayed wireless communication.

8. The method of claim 1, wherein the SI1 is received less frequently than receiving the SI2.

9. A method performed by a relay wireless device providing a relayed wireless communication between a remote wireless device and a second cell of an access network, wherein the relayed wireless communication is relayed through the relay wireless device located in the second cell while the remote wireless device is located in a first cell of the access network other than the second cell, the method comprising or initiating at least one of the steps of:

transmitting system information, SI1, of the first cell comprising public warning system, PWS, information relevant to the first cell to the remote wireless device; and transmitting system information, SI2, of the second cell to the remote wireless device, the method further comprising or initiating the steps of:

receiving, from the remote wireless device via a sidelink, a report of the cell ID of the first cell;

forwarding the reported cell ID of the first cell to the second cell, wherein the second cell retrieves the SI1 from the first cell via an X2 interface or an Xn interface in response to the forwarded cell ID; and receiving the SI1 comprising the PWS information relevant to the first cell from the second cell responsive to the forwarded cell ID of the first cell, for delivery to the remote wireless device.

10. The method of claim 9, wherein the relay wireless device further receives the SI2 from the second cell, the method further comprising or initiating at least one of the steps of:

discarding PWS information in the SI2, wherein only the PWS information in the SI1 is transmitted to the remote wireless device; and combining PWS information in the SI1 and PWS information in the SI2 into a combined PWS information, wherein the combined PWS information is transmitted to the remote wireless device.

11. A remote wireless device in relayed wireless communication with a second cell of an access network, wherein the relayed wireless communication is relayed through a relay wireless device located in the second cell while the remote wireless device is located in a first cell of the access network other than the second cell, configured to receive system information, SI1, of the first cell comprising public warning system, PWS, information relevant to the first cell, via the relay wireless device through a sidelink between the remote wireless device and the relay wireless device, wherein the SI1 is received responsive to the remote wireless device reporting a cell identity, cell ID, of the first cell to the relay wireless device to trigger delivery of the SI1; and receive system information, SI2, of the second cell comprising public warning system, PWS, information relevant to the second cell, the remote wireless device is further configured to perform one of the steps of:

discarding the PWS information relevant to the second cell if the SI1 comprises PWS information relevant to the first cell, and if at least one of the following applies:

the PWS information relevant to the first cell in the SI1 is not older than the SI2 or the PWS information relevant to the second cell in the SI2, and/or the SI1 or the PWS information relevant to the first cell in the SI1 is not outdated; or acting on the PWS information relevant to the second cell if the SI1 does not comprise PWS information relevant to the first cell, or if at least one of the following applies:

the SI1 or the PWS information relevant to the first cell in the SI1 is older than the SI2 or the PWS information relevant to the second cell in the SI2, and/or the SI1 or the PWS information relevant to the first cell in the SI1 is outdated.

12. The device of claim 11, wherein at least one of:

the SI2 is indicative of an access stratum, AS, of the second cell;

the SI2 is indicative of a non-access stratum, NAS, of a core network of the second cell;

the SI2 comprises a master information block, MIB, of the second cell; and the SI2 comprises at least one of a system information block 1, SIB1, of the second cell, SIB2 of the second cell, SIB3 of the second cell, SIB4 of the second cell, SIB5 of the second cell, SIB11 of the second cell, SIB12 of the second cell, SIB13 of the second cell, and SIB14 of the second cell.

13. The device of claim 11, wherein the SI1 is incomplete or partial system information of the first cell, and/or wherein the remote wireless device applies the SI1 incompletely or partially.

14. The device of claim 11, wherein the remote wireless device acts on both PWS information in the SI1 and PWS information in the SI2.

15. The device of claim 11, wherein the remote wireless device applies a portion of the SI1 and a portion of the SI2.

16. The device of claim 11, wherein the device is further configured to selectively act on and discard the PWS information relevant to the second cell, depending on a type of the PWS information relevant to the second cell, optionally the type including at least one of a Commercial Mobile Alert System, CMAS; an Earthquake and Tsunami Warning System, ETWS; a Wireless Emergency Alert, WEA; and a Cell Broadcast Service, CBS.

17. The device of claim 11, wherein the SI2 is received from the second cell in the relayed wireless communication.

18. A relay wireless device providing a relayed wireless communication between a remote wireless device and a second cell of an access network, wherein the relayed wireless communication is relayed through the relay wireless device located in the second cell while the remote wireless device is located in a first cell of the access network other than the second cell, configured to transmit system information, SI1, of the first cell comprising public warning system, PWS, information relevant to the first cell to the remote wireless device; and transmit system information, SI2, of the second cell to the remote wireless device, the relay wireless device is further configured to receive, from the remote wireless device via a sidelink, a report of the cell ID of the first cell, forward the reported cell ID of the first cell to the second cell, wherein the second cell retrieves the SI1 from the first cell via an X2 interface or an Xn interface in response to the forwarded cell ID, and to receive the SI1 comprising the PWS information relevant to the first cell from the second cell responsive to the forwarded cell ID of the first cell, for delivery to the remote wireless device.

* * * * *